United States Patent
Hottmann

(10) Patent No.: US 10,234,194 B2
(45) Date of Patent: Mar. 19, 2019

(54) DOOR MANUFACTURING METHOD FOR A FREEZER DRAWER

(71) Applicant: Sub-Zero, Inc., Madison, WI (US)

(72) Inventor: Philip Francis Hottmann, Verona, WI (US)

(73) Assignee: SUB-ZERO, INC., Madison, WI (US)

(*) Notice: Subject to any disclaimer, the term of this patent is extended or adjusted under 35 U.S.C. 154(b) by 165 days.

(21) Appl. No.: 15/460,463

(22) Filed: Mar. 16, 2017

(65) Prior Publication Data

US 2018/0266754 A1  Sep. 20, 2018

(51) Int. Cl.
| F25D 25/02 | (2006.01) |
| F25D 23/02 | (2006.01) |
| F25D 23/06 | (2006.01) |
| B29C 65/08 | (2006.01) |
| F25D 23/08 | (2006.01) |
| B29K 101/12 | (2006.01) |
| B29L 31/00 | (2006.01) |

(52) U.S. Cl.
CPC ............ *F25D 25/025* (2013.01); *B29C 65/08* (2013.01); *F25D 23/02* (2013.01); *F25D 23/066* (2013.01); *B29K 2101/12* (2013.01); *B29L 2031/724* (2013.01); *B29L 2031/762* (2013.01); *F25D 23/087* (2013.01); *Y10T 29/4998* (2015.01); *Y10T 29/49872* (2015.01); *Y10T 29/49876* (2015.01); *Y10T 29/49966* (2015.01)

(58) Field of Classification Search
CPC .. F25D 25/025; F25D 2201/12; F25D 33/066; F25D 23/087; B29C 65/08; Y10T 29/49876; Y10T 29/4996; Y10T 29/4998; Y10T 29/49872
See application file for complete search history.

(56) References Cited

U.S. PATENT DOCUMENTS

| 2,607,966 A * | 8/1952 | Beck ..................... F25D 23/087 |
| | | 277/641 |
| 2,636,228 A * | 4/1953 | Morton ................ F25D 23/087 |
| | | 49/496.1 |
| 3,137,900 A | 6/1964 | Carbary |
| 3,223,276 A * | 12/1965 | Heinrich ............. A47L 15/4263 |
| | | 220/232 |
| 4,822,117 A * | 4/1989 | Boston, Jr. ............ F25D 23/062 |
| | | 29/455.1 |
| 4,829,652 A * | 5/1989 | Haas ..................... B23P 19/047 |
| | | 29/235 |
| 5,533,311 A | 7/1996 | Tirrell et al. |
| (Continued) | | |

OTHER PUBLICATIONS http://www.smeg.com/smeg_com/docs/product_pdf2/FL227A.pdf, Downloaded on or before May 16, 2017.
(Continued)

*Primary Examiner* — Jermie Cozart
(74) *Attorney, Agent, or Firm* — Bell & Manning, LLC

(57) ABSTRACT

A method of making a gasket track for a gasket is provided. A first section of a c-shaped channel comprising from 50% to 75% of the c-shaped channel of a first plastic material is formed. A second section of a c-shaped channel comprising from 25% to 50% of the c-shaped channel of a second plastic material is formed. The first section is joined together with the second section to form all of the c-shaped channel. The c-shaped channel has a circular cross section that forms at least 65% of an ellipse.

20 Claims, 35 Drawing Sheets

(56) References Cited

U.S. PATENT DOCUMENTS

| | | | | |
|---|---|---|---|---|
| 5,810,179 | A * | 9/1998 | Kleiman | A47B 61/00 |
| | | | | 211/106 |
| 8,083,305 | B2 | 12/2011 | Lee et al. | |
| 8,147,017 | B2 | 4/2012 | Casoli | |
| 8,230,647 | B2 * | 7/2012 | Cho | F25D 23/02 |
| | | | | 49/489.1 |
| 8,869,493 | B2 | 10/2014 | Chubb et al. | |
| 9,279,609 | B2 | 3/2016 | Kim et al. | |
| 9,435,580 | B2 | 9/2016 | Dubina et al. | |
| 9,885,202 | B2 | 2/2018 | Laible | |
| 2002/0020118 | A1 | 2/2002 | Horn et al. | |
| 2002/0153816 | A1 * | 10/2002 | Banicevic | F25D 23/04 |
| | | | | 312/404 |
| 2003/0066423 | A1 * | 4/2003 | Shah | B01D 46/0004 |
| | | | | 95/273 |
| 2003/0192845 | A1 * | 10/2003 | Lawson | A47F 5/0846 |
| | | | | 211/94.01 |
| 2011/0210655 | A1 | 9/2011 | Brown et al. | |

OTHER PUBLICATIONS https://home.liebherr.com/media/hau/brochures/ncsa/us-fr/pdf/liebherr-north-american-residential-catalog.pdf, Downloaded on or before May 16, 2017.

RB289203, http://www.gaggenau.com/gb/product/RB289/variation/RB289203, Downloaded on or before May 16, 2017.

RC289203, http://www.gaggenau.com/gb/product/RC289/variation/RC289203, Downloaded on or before May 16, 2017.

RT289203, http://www.gaggenau.com/gb/product/RT289/variation/RT289203, Downloaded on or before May 16, 2017.

* cited by examiner

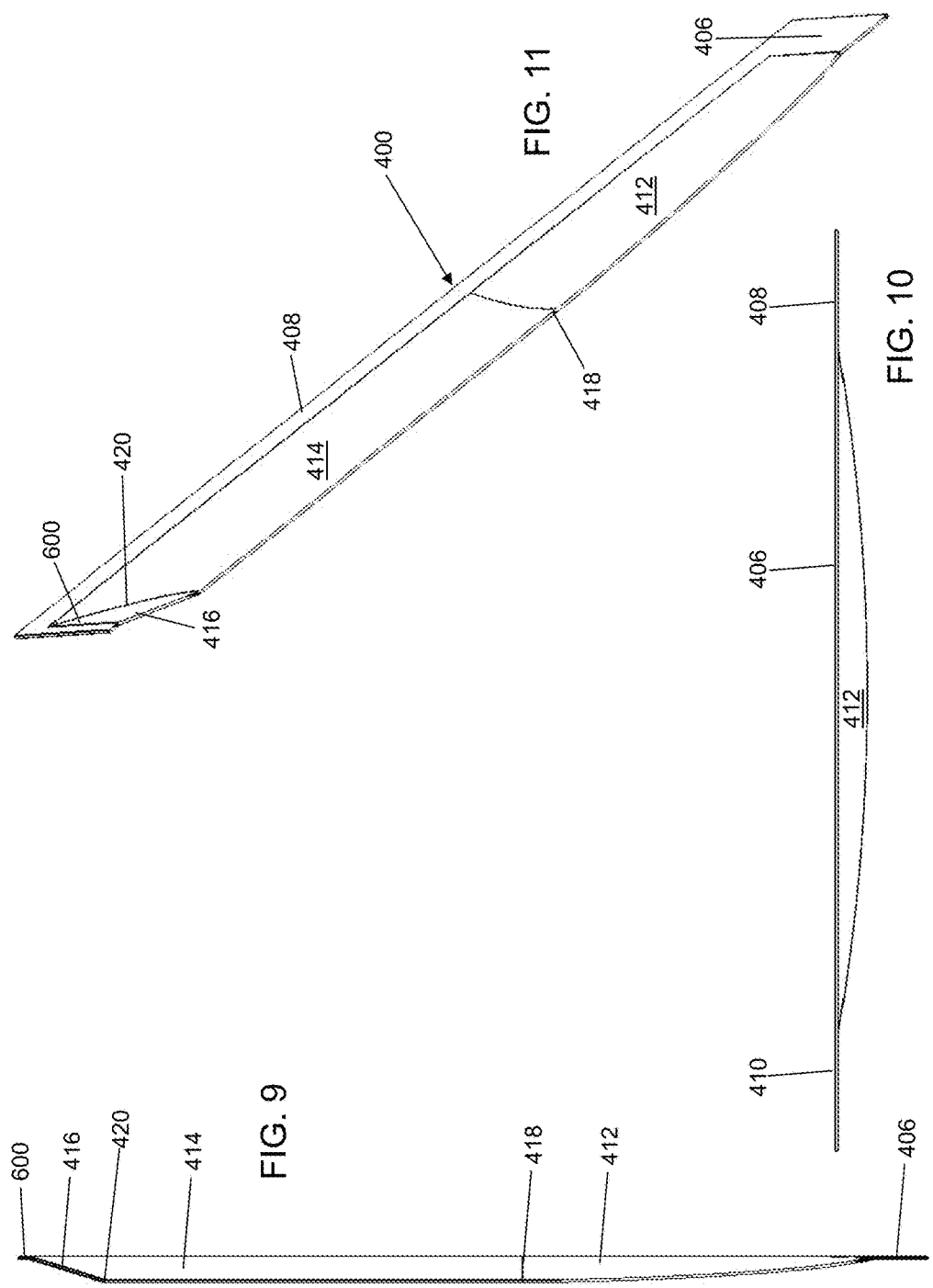

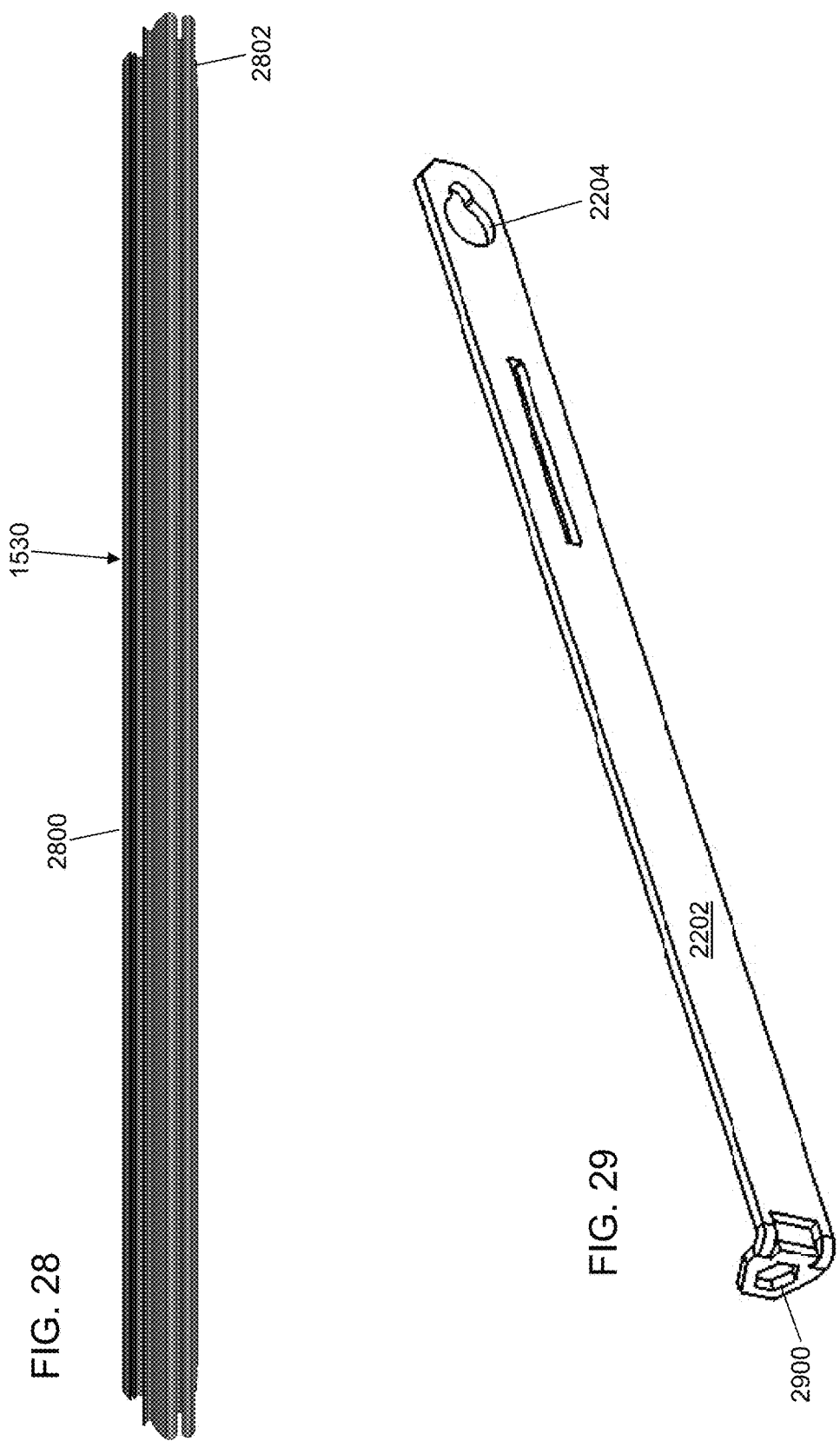

DOOR MANUFACTURING METHOD FOR A FREEZER DRAWER

BACKGROUND

Refrigerators and freezers are designed to comply with energy consumption targets that are enforced by regulatory agencies for both domestic and international markets. These energy consumption targets are consistently updated to ever more stringent values leading appliance manufactures to constantly improve their design through proper component selection, system optimization, and use of efficient controls. Refrigerators and freezers are further designed to aesthetically complement a kitchen including the surrounding cabinetry and other appliances. Single door refrigerator-freezers improve kitchen aesthetics by including freezers in the refrigerator compartment. This arrangement, however, does not allow independent zone control, results in poor food preservation, and wastes energy by releasing colder freezer air when the single door is opened because refrigerator zones are estimated to be accessed four times more often than freezer zones. Sealing each zone separately using a single door creates issues with frost management in the freezer zone due to exposure to warmer air each time the door is opened.

SUMMARY

In an example embodiment, a method of making a gasket track for a gasket is provided. A first section of a c-shaped channel comprising from 50% to 75% of the c-shaped channel of a first plastic material is formed. A second section of a c-shaped channel comprising from 25% to 50% of the c-shaped channel of a second plastic material is formed. The first section is joined together with the second section to form all of the c-shaped channel. The c-shaped channel has a circular cross section that forms at least 65% of an ellipse.

In another example embodiment, a method of making a drawer panel for a freezer drawer is provided. A first section of a c-shaped channel comprising from 50% to 75% of the c-shaped channel of a first plastic material is formed. A second section of a c-shaped channel comprising from 25% to 50% of the c-shaped channel of a second plastic material is formed. The first section is joined together with the second section to form all of the c-shaped channel. The c-shaped channel has a circular cross section that forms at least 65% of an ellipse. The joining attaches a liner shell to a ring wall. A panel face shell is attached to the ring wall. A gasket is inserted into the c-shaped channel.

In yet another example embodiment, a method of making a freezer drawer is provided. A first section of a c-shaped channel comprising from 50% to 75% of the c-shaped channel of a first plastic material is formed. A second section of a c-shaped channel comprising from 25% to 50% of the c-shaped channel of a second plastic material is formed. The first section is joined together with the second section to form all of the c-shaped channel. The c-shaped channel has a circular cross section that forms at least 65% of an ellipse. The joining attaches a liner shell to a ring wall. A container is attached to the liner shell. A panel face shell is attached to the ring wall. A gasket is inserted into the c-shaped channel.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 9 depicts a cross sectional view of a freezer section wall of the liner of FIG. 7 in accordance with an illustrative embodiment.

FIG. 10 depicts a bottom view of the freezer section wall 400 of FIG. 9 in accordance with an illustrative embodiment.

FIG. 11 depicts a perspective, cross sectional view of the freezer section wall of FIG. 9 in accordance with an illustrative embodiment.

FIG. 28 depicts a side view of a top drawer gasket of the top drawer panel of FIG. 24 in accordance with an illustrative embodiment.

FIG. 29 depicts a right brace of the top drawer panel of FIG. 24 in accordance with an illustrative embodiment.

DETAILED DESCRIPTION

Figure 1:
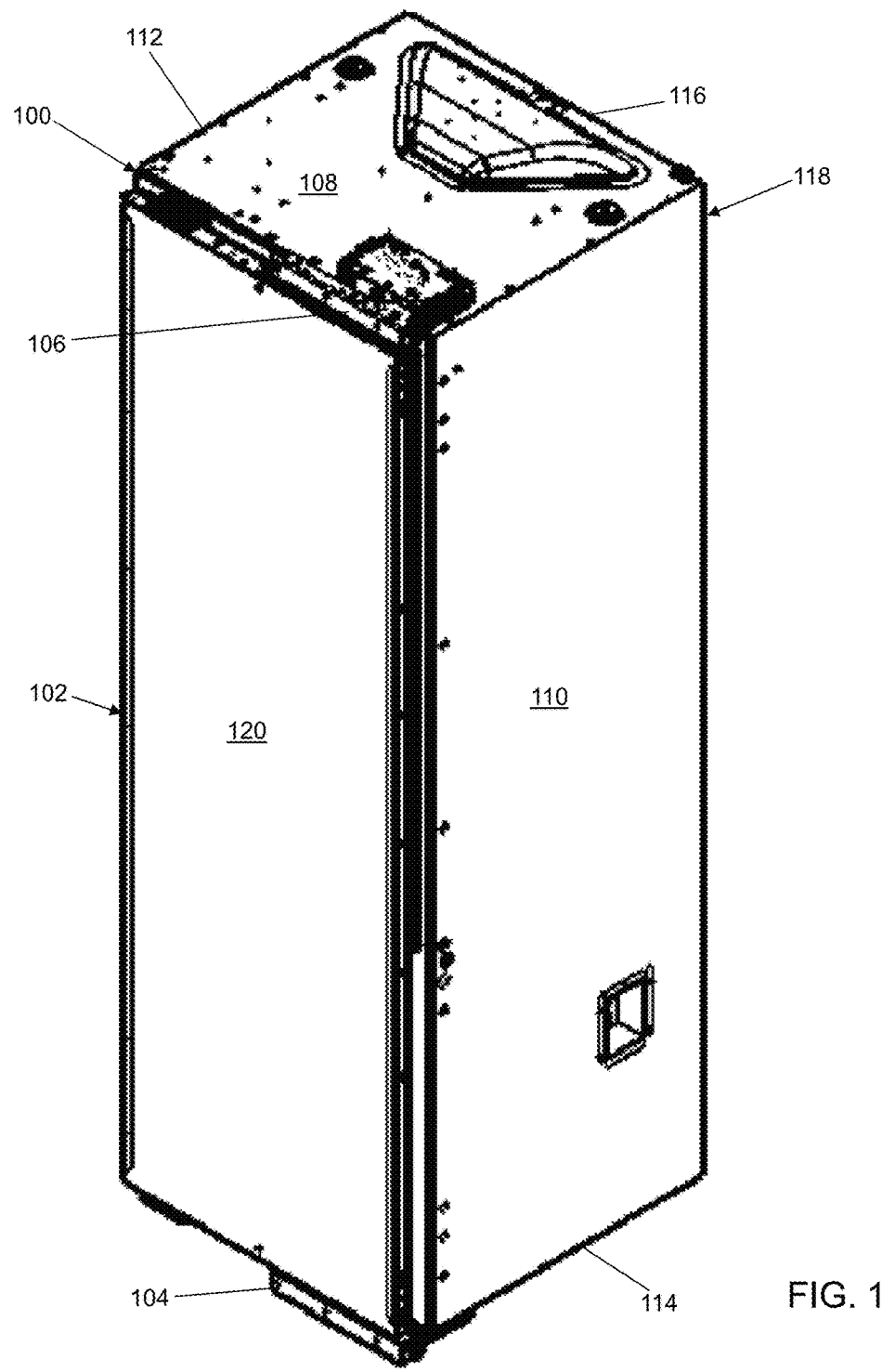
FIG. 1 depicts a right side, perspective view of a refrigerator with a closed door in accordance with an illustrative embodiment.
Figure 2:
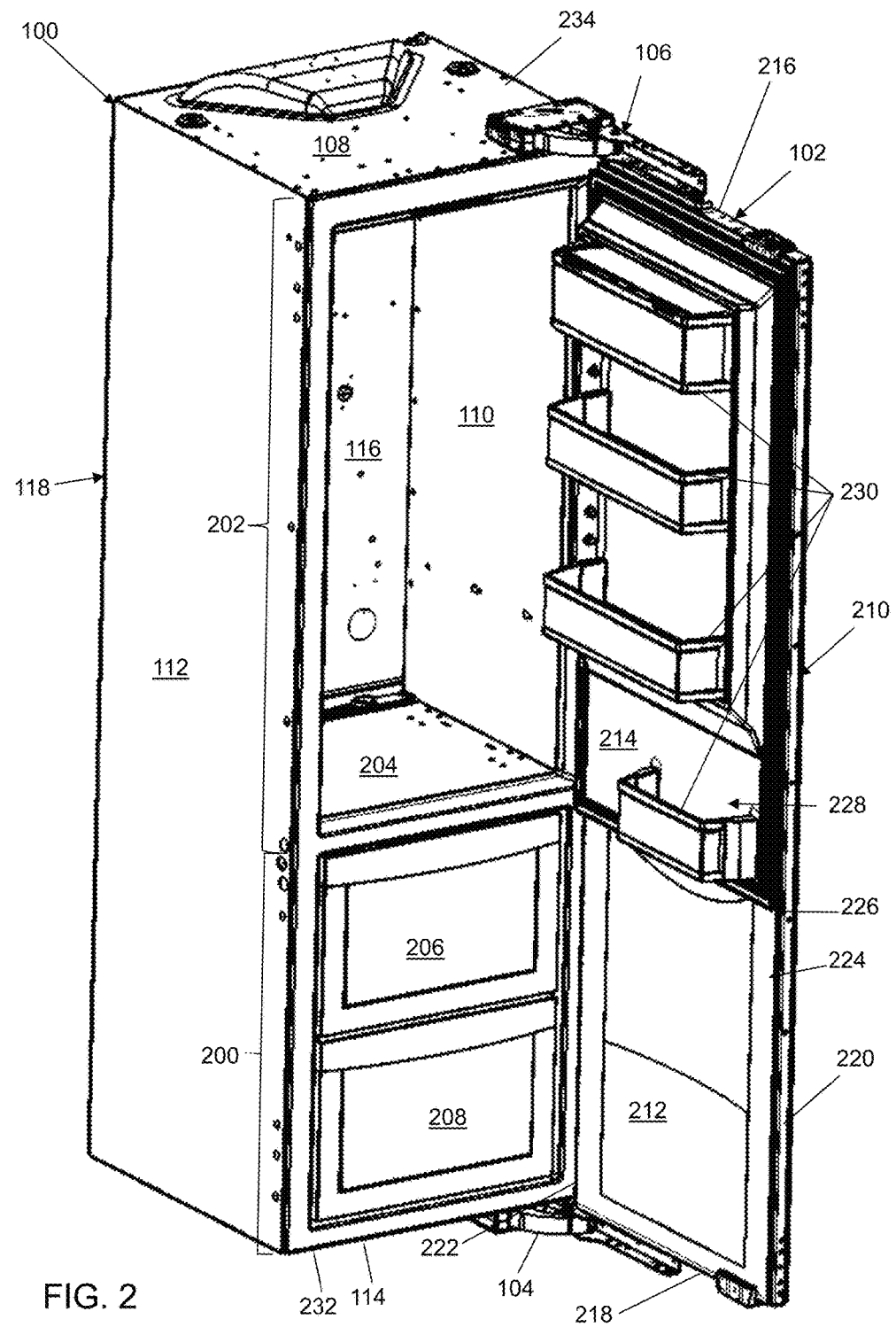
FIG. 2 depicts a front perspective view of the refrigerator of FIG. 1 in accordance with an illustrative embodiment with the door in an open position relative to a refrigerator body.

With reference to FIG. 1, a refrigerator 100 is shown in accordance with an illustrative embodiment. Refrigerator 100 may include a door 102, a bottom hinge 104, a top hinge 106, a top wall 108, a right side wall 110, a left side wall 112, a bottom wall 114, and a back wall 116. Top wall 108, right side wall 110, left side wall 112, bottom wall 114, and back wall 116 define a refrigerator body 118. Referring to FIG. 1, door 102 is in a closed position relative to refrigerator body 118. With reference to FIG. 2, refrigerator 100 is shown in accordance with an illustrative embodiment with door 102 in an open position relative to refrigerator body 118 to expose a freezer compartment 200 and a refrigerator compartment 202 to outside air.

In the illustrative embodiment, door 102 is rotably mounted to top wall 108 and bottom wall 114 using top hinge 106 and bottom hinge 104, respectively. In alternative embodiments, door 102 may be rotably mounted to different walls of refrigerator 100 using a fewer or a greater number of hinges. In a preferred embodiment, only bottom hinge 104 and top hinge 106 are used to mount door 102 to refrigerator body 118.

In the illustrative embodiment of FIGS. 1 and 2, bottom hinge 104 and top hinge 106 are mounted to a right side of refrigerator 100 such that door 102 opens from a left side of refrigerator 100. In an alternative embodiment, bottom hinge 104 and top hinge 106 are mounted to a left side of refrigerator 100 such that door 102 opens from a right side of refrigerator 100. For illustration, bottom hinge 104 and/or top hinge 106 may be similar to that described in U.S. Pat. No. 8,572,808 titled CONTROLLED CLOSURE SYSTEM FOR A HINGE and issued Nov. 5, 2013, and assigned to the assignee of the present application. Bottom hinge 104 is mounted to a bottom surface 232 of bottom wall 114 and to a bottom surface 218 of door 102. Similarly, top hinge 106 is mounted to a top surface 234 of top wall 108 and to a top surface 216 of door 102.

Door 102 provides access to freezer compartment 200 defined by a divider wall 204, right side wall 110, left side wall 112, bottom wall 114, back wall 116, and a freezer section 212 of door 102 when door 102 is in a closed position. Door 102 also provides access to refrigerator compartment 202 defined by top wall 108, right side wall 110, left side wall 112, divider wall 204, back wall 116, and a refrigerator section 214 of door 102 when door 102 is in a closed position. In general, a temperature of refrigerator compartment 202 is maintained at an adequate temperature for fresh foods by appropriate cooling components (one or more compressors, evaporators, condensers, dryers, etc.) as understood by a person of skill in the art, and a temperature of freezer compartment 200 is maintained at an adequate temperature for frozen foods by appropriate cooling components as understood by a person of skill in the art. The cooling components may be shared or separate for each of freezer compartment 200 and refrigerator compartment 202.

In the illustrative embodiment of FIG. 2, freezer compartment 200 is mounted below refrigerator compartment 202 though in an alternative embodiment refrigerator compartment 202 is mounted below freezer compartment 200. In alternative embodiments, refrigerator 100 may include a plurality of freezer compartments and/or a plurality of refrigerator compartments arranged in various stacked arrangements. For example, a second freezer compartment may be mounted above refrigerator compartment 202 with a corresponding modification to door 102 based on the description below.

In the illustrative embodiment of FIG. 2, freezer compartment 200 includes a top drawer 206 and a bottom drawer 208 though freezer compartment 200 may include a fewer or a greater number of drawers. Additionally, top drawer 206 and bottom drawer 208 are arranged to form a vertical stack of drawers. In an alternative embodiment, the drawers may be stacked vertically and/or horizontally.

Door 102 includes an insulated door panel 210 that includes a front face 120, a top surface 216, a bottom surface 218, a left surface 220, a right surface 222, and a liner 224. Liner 224 may be formed of a plastic material and mounted between top surface 216, bottom surface 218, left surface 220, and right surface 222. The plastic material may comprise a thermoplastic polymer. A decorative panel may or may not be mounted to front face 120 as understood by a person of skill in the art. Liner 224 defines freezer section 212 and refrigerator section 214 though liner 224 may be a single continuous piece of material, for example, by molding, or may be formed of multiple distinct pieces mounted together, for example, attached to each other using various fasteners including adhesives, screws, rivets, etc. In the illustrative embodiment of FIG. 2, freezer section 212 is mounted below refrigerator section 214 in vertical and horizontal alignment with freezer compartment 200 and refrigerator compartment 202, respectively. Freezer section 212 is configured to cover freezer compartment 200 of refrigerator 100 when door 102 is positioned in the closed position relative to refrigerator body 118. Refrigerator section 214 is configured to cover refrigerator compartment 202 of refrigerator 100 when door 102 is positioned in the closed position relative to refrigerator body 118.

A refrigerator door gasket 226 is inserted in a refrigerator door gasket channel 602 (shown referring to FIG. 6) that surrounds refrigerator section 214 to seal refrigerator compartment 202 when door 102 is positioned in the closed position relative to refrigerator body 118, whereas freezer section 212 is not surrounded by any gasket. Refrigerator door shelves 230 are mounted to a refrigerator door shelf panel 228 that is mounted to protrude from liner 224. Refrigerator door shelf panel 228 may be integrally formed as part of liner 224.

Though shown in the illustrative embodiment as forming a generally rectangular shaped enclosure with generally rectangular shaped components, refrigerator 100 may form any shaped enclosure including other polygons as well as circular or elliptical enclosures. As a result, door 102 and the walls forming refrigerator body 118 may have any shape including other polygons as well as circular or elliptical shapes.

Use of directional terms, such as top, bottom, right, left, front, back, etc. are merely intended to facilitate reference to the various surfaces and elements of the described structures relative to the orientations shown in the drawings and are not intended to be limiting in any manner. For consistency, the components of refrigerator 100 are labeled relative to front face 120 with door 102 in a closed position.

As used in this disclosure, the term "mount" includes join, unite, connect, couple, associate, insert, hang, hold, affix, attach, fasten, bind, paste, secure, bolt, screw, rivet, solder, weld, glue, adhere, form over, layer, and other like terms. The phrases "mounted on" and "mounted to" include any interior or exterior portion of the element referenced. These phrases also encompass direct mounting (in which the referenced elements are in direct contact) and indirect mounting (in which the referenced elements are not in direct contact). Elements referenced as mounted to each other herein may further be integrally formed together, for example, using a molding process as understood by a person of skill in the art. As a result, elements described herein as being mounted to each other need not be discrete structural elements.

Figure 3:
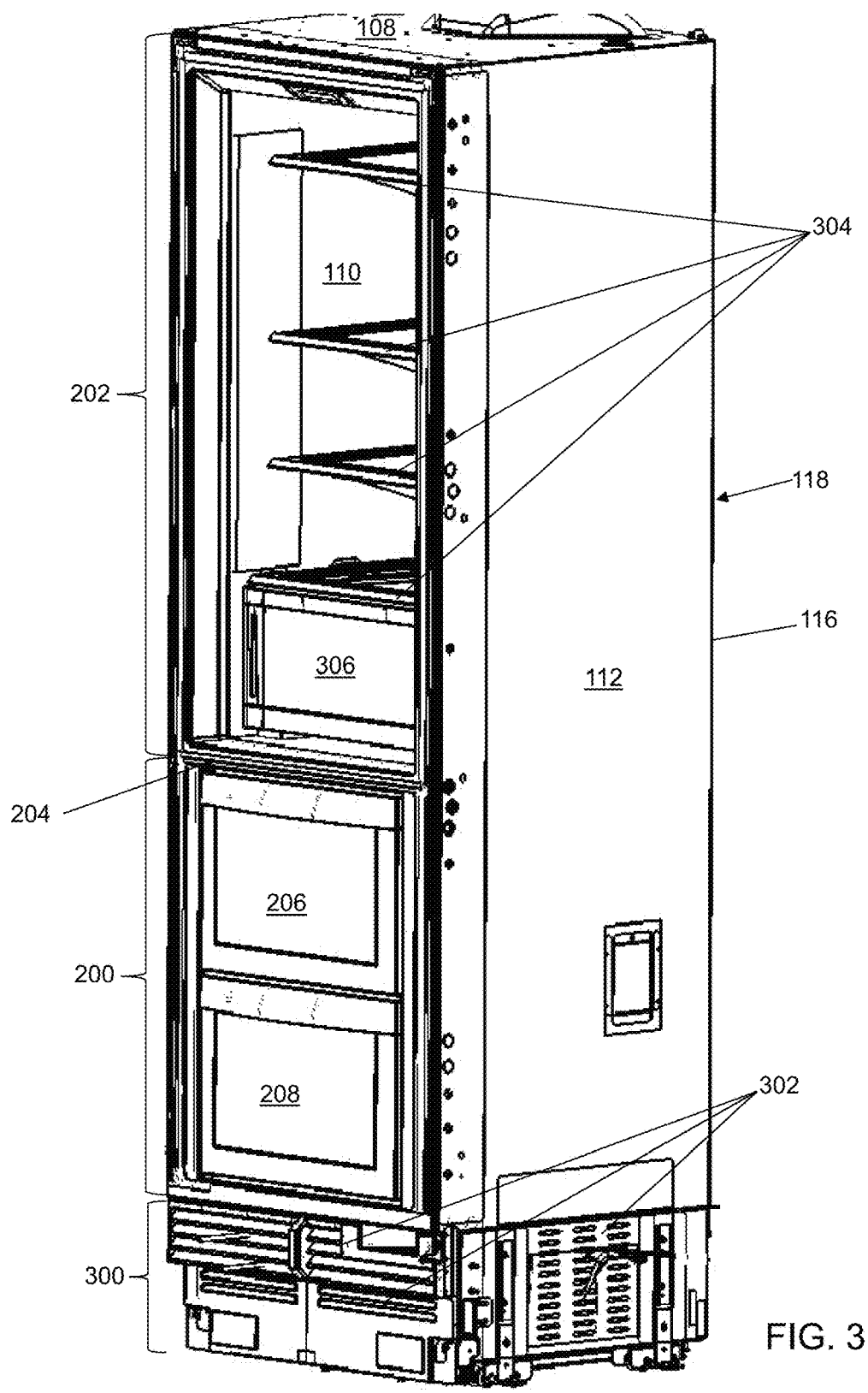
FIG. 3 depicts right side, perspective view of the refrigerator body of FIG. 2 in accordance with an illustrative embodiment.

With reference to FIG. 3, refrigerator 100 is shown in accordance with an illustrative embodiment without door 102. Refrigerator 100 further includes a pedestal frame 300 on which refrigerator body 118 is mounted. The cooling components (not shown) are mounted within pedestal frame 300 and/or within or behind back wall 116. The cooling components may be located in other locations of refrigerator 100. One or more vent plates 302 are mounted to pedestal frame 300 to allow air, which may be warm relative to an outside air, to flow from the cooling components through the one or more vent plates 302 to an exterior of refrigerator 100. As will be described below, the air further may partially flow into freezer compartment 200 to remove condensation that may develop around top drawer 206 and bottom drawer 208.

One or more shelves 304, drawers, or other receptacles may be mounted within refrigerator compartment 202. For example, refrigerator compartment 202 may include a crisper drawer 306 though a fewer or a greater number of drawers may be included within refrigerator compartment 202 at various locations. As understood by a person of skill in the art, door 102 and the walls that form refrigerator body 118 of refrigerator 100 include insulation to assist in maintenance of the desired temperature in freezer compartment 200 and in refrigerator compartment 202. The components of refrigerator 100 including refrigerator body 118 may be formed of one or more materials, such as metals, glass, and/or plastics having a sufficient strength and rigidity and aesthetic value to provide the illustrated and/or described function. Electrical wiring and various conduits may further be located in the walls of refrigerator body 118. For example, the one or more shelves 304, crisper drawer 306, or other receptacles may be formed of one or more materials, such as metals, glass, and/or plastics having a sufficient strength and rigidity to support food items or other items stored in refrigerator 100 while providing an attractive appearance.

Figure 4:
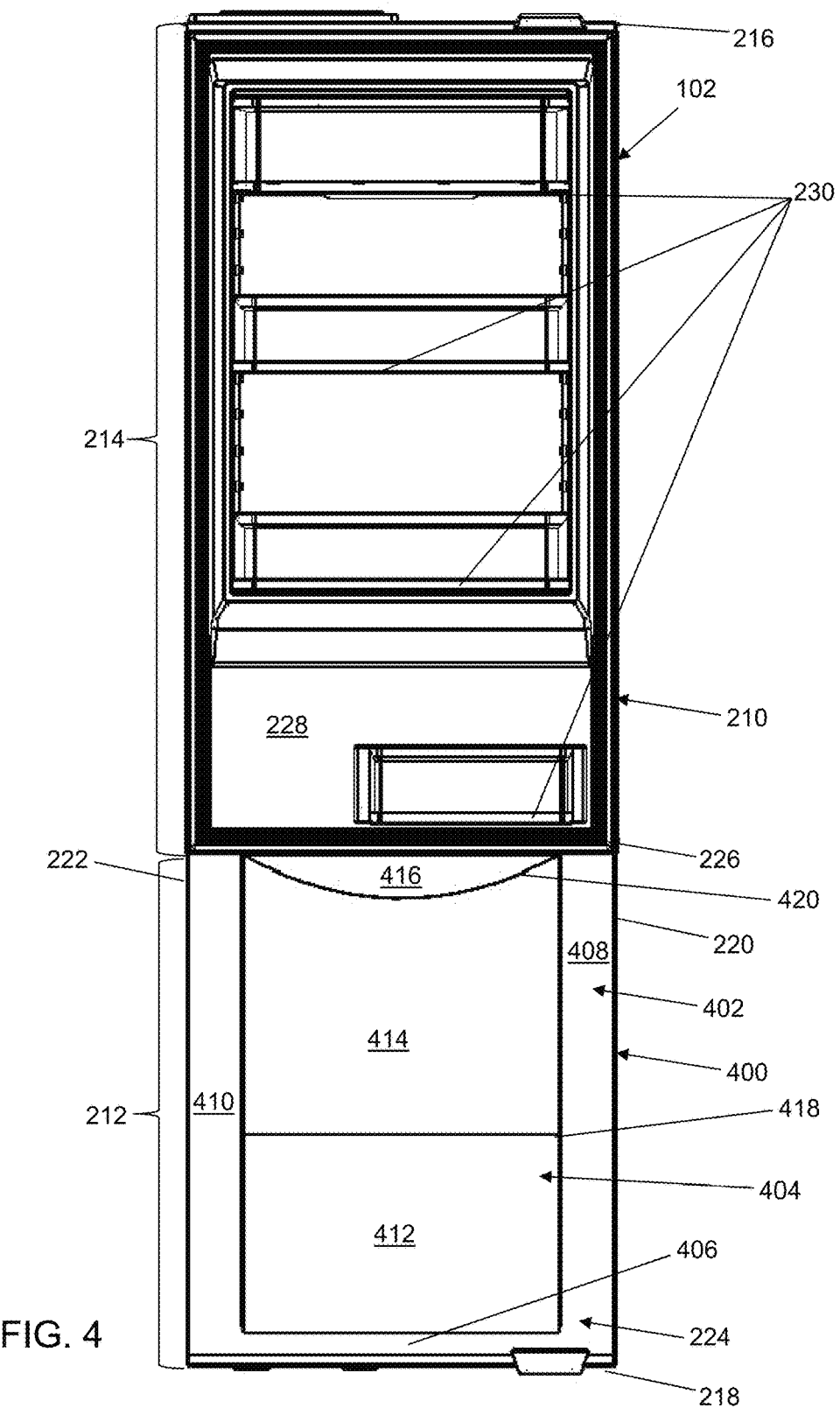
FIG. 4 depicts a back view of the door of FIG. 2 in accordance with an illustrative embodiment.
Figure 5:
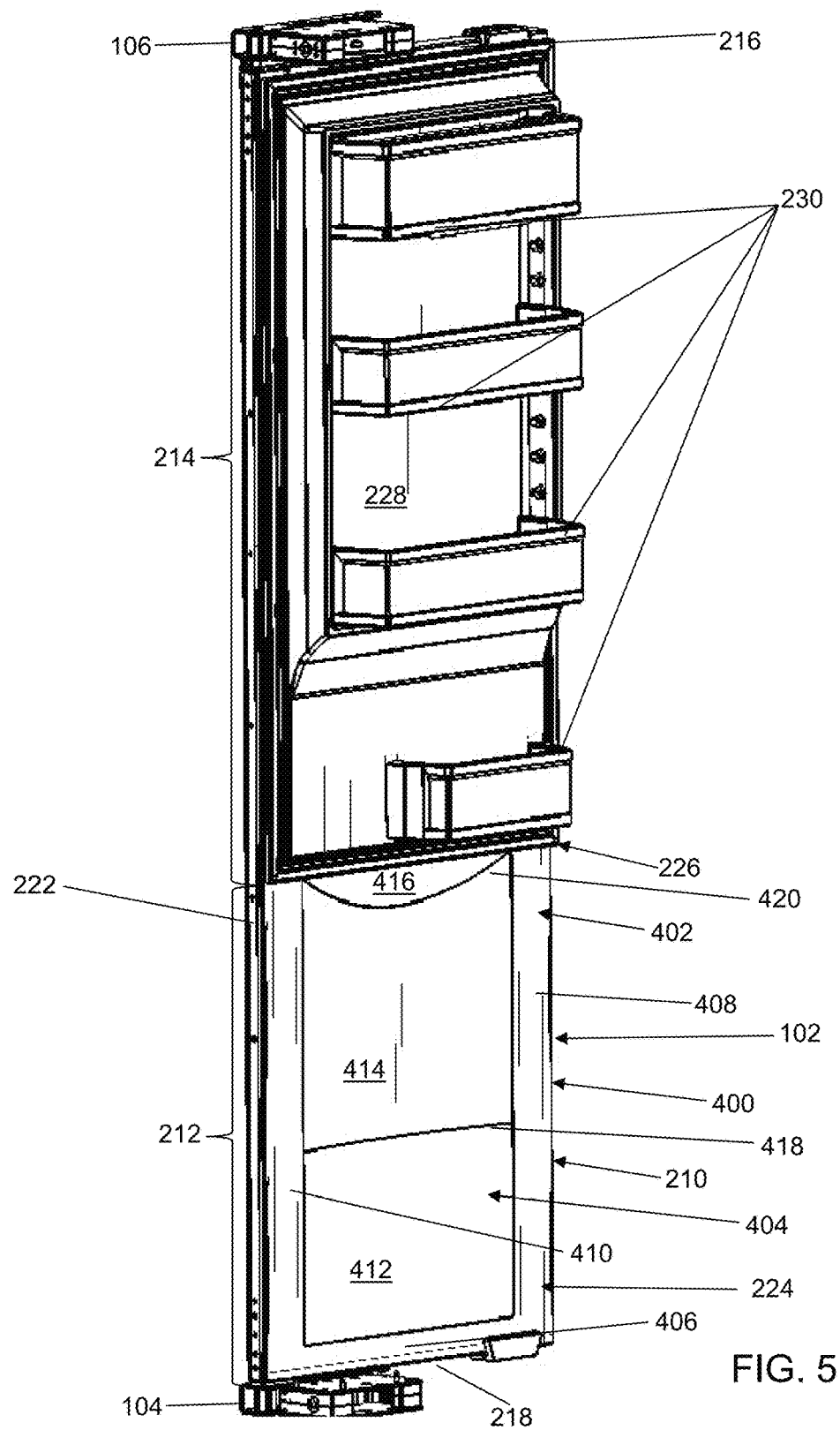
FIG. 5 depicts a perspective, back view of the door of FIG. 2 in accordance with an illustrative embodiment.
Figure 6:
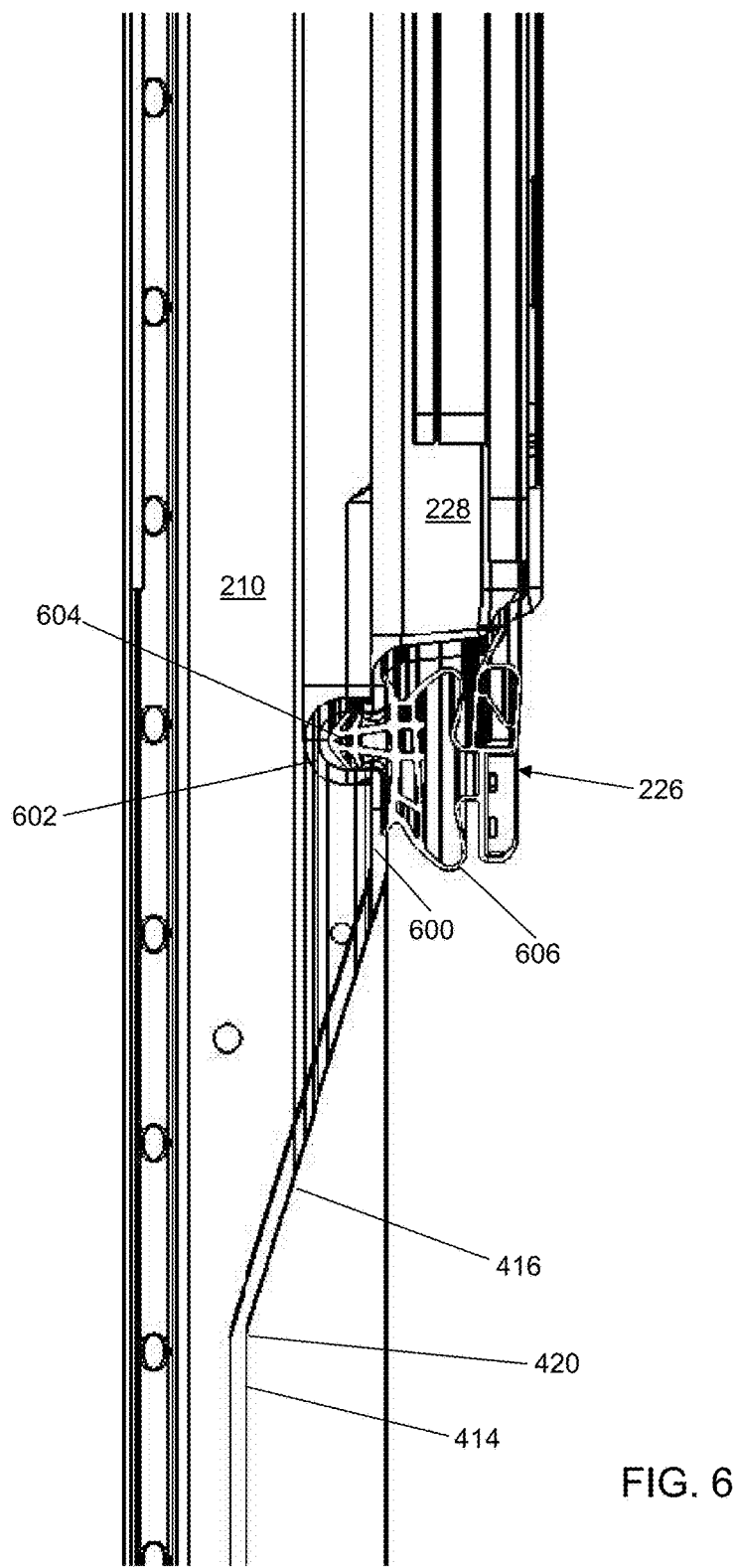
FIG. 6 depicts a perspective, zoomed cross sectional view of the door of FIG. 2 in accordance with an illustrative embodiment.
Figure 7:
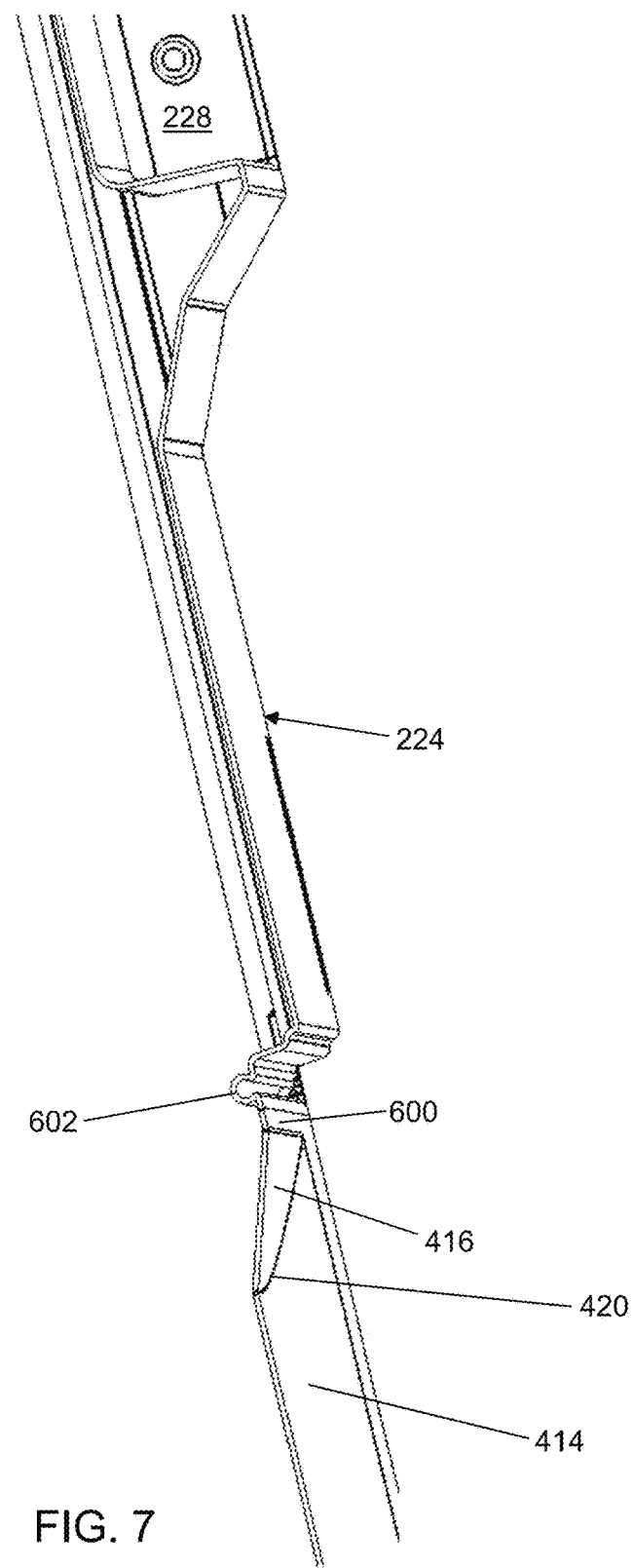
FIG. 7 depicts a perspective, zoomed cross sectional view of a liner of the door of FIG. 2 in accordance with an illustrative embodiment.
Figure 8:
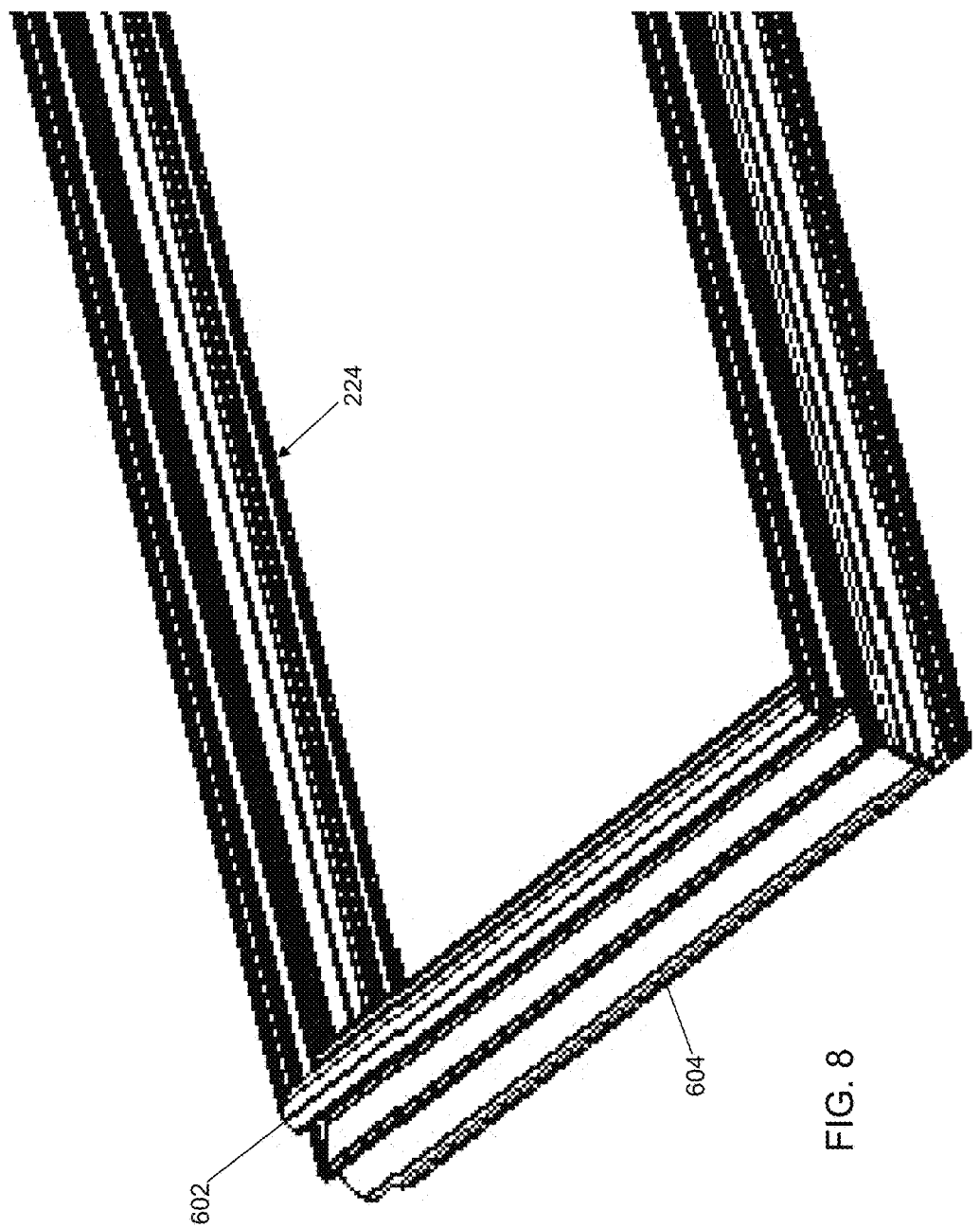
FIG. 8 depicts a perspective, zoomed view of a portion of a refrigerator door gasket of the door of FIG. 2 in accordance with an illustrative embodiment.

With reference to FIG. 4, a back view of door 102 is shown in accordance with an illustrative embodiment. With reference to FIG. 5, a perspective, back view of door 102 is shown in accordance with an illustrative embodiment. With reference to FIG. 6, a perspective, zoomed cross sectional view of door 102 is shown in accordance with an illustrative embodiment. With reference to FIG. 7, a perspective, zoomed cross sectional view of liner 224 of door 102 is shown in accordance with an illustrative embodiment. With reference to FIG. 8, a perspective, zoomed view of a portion of refrigerator door gasket 226 of door 102 is shown in accordance with an illustrative embodiment. With reference to FIG. 9, a cross sectional view of freezer section wall 400 of liner 224 of door 102 is shown in accordance with an illustrative embodiment. With reference to FIG. 10, a bottom view of freezer section wall 400 of liner 224 of door 102 is shown in accordance with an illustrative embodiment. With reference to FIG. 11, a perspective, cross sectional view of freezer section wall 400 of liner 224 of door 102 is shown in accordance with an illustrative embodiment.

Referring to FIGS. 4-7 and 9-11, liner 224 includes a freezer section wall 400. Freezer section wall 400 includes a flat surface 402 and a depression 404 though freezer section wall 400 may be a single continuous piece of material, for example, by molding, or may be formed of multiple distinct pieces mounted together, for example, attached to each other using various fasteners including adhesives, screws, rivets, etc. Flat surface 402 may include a bottom flat surface 406, a left flat surface 408, a right flat surface 410, and a top flat surface 600. Bottom flat surface 406 may extend up from bottom surface 218 to an edge of depression 404. Left flat surface 408 may extend to the right from left surface 220 to an edge of depression 404. Right flat surface 410 may extend to the left from right surface 222 to an edge of depression 404. Top flat surface 600 may extend down from a refrigerator door gasket channel 602 to an edge of depression 404.

Depression 404 may include a bottom curved surface 412, a middle curved surface 414, and a top curved surface 416. Bottom curved surface 412 may extend up from an edge of bottom flat surface 406 to a transition line 418 along a lowest point of depression 404. Bottom curved surface 412 is bounded by bottom flat surface 406, left flat surface 408, right flat surface 410, and transition line 418. Bottom curved surface 412 has a concave shape between left flat surface 408 and right flat surface 410 and between bottom flat surface 406 and transition line 418 to generally form a bowl.

Middle curved surface 414 may extend between transition line 418 and transition curve 420. Middle curved surface 414 is bounded by top curved surface 416, left flat surface 408, right flat surface 410, and transition line 418. Middle curved surface 414 has a concave shape between left flat surface 408 and right flat surface 410 to generally form a shallow cylinder.

Top curved surface 416 may extend down from an edge of top flat surface 600 to transition curve 420. Top curved surface 416 is bounded by top flat surface 600 and transition curve 420. Top curved surface 416 has a linear slope between top flat surface 600 and transition curve 420. Because bottom curved surface 412 has a concave shape, transition curve 420 is arc shaped.

Referring to FIGS. 6-8, refrigerator door gasket 224 may include a refrigerator door gasket prong 604 and a refrigerator door gasket body 606. Refrigerator door gasket prong 604 is inserted into refrigerator door gasket channel 602 that has a generally c- or u-shape to mount refrigerator door gasket 224 to liner 224. Refrigerator door gasket channel 602 is sized and shaped to hold refrigerator door gasket prong 604 of refrigerator door gasket 224. When refrigerator door 102 is positioned in the closed position relative to refrigerator body 118, refrigerator door gasket body 606 compresses against liner 224 to seal refrigerator compartment 202 providing an air tight seal and thereby preventing moisture and relatively warm air from migrating into refrigerator compartment 202 and keeping cool air in refrigerator compartment 202. As understood by a person of skill in the art, refrigerator door gasket 224 may be made from a material that is deformable to tightly fill the space between liner 224 and refrigerator compartment 202. For example, refrigerator door gasket 224 may be formed of plastic, rubber or other elastomeric material to provide the compression sealing between refrigerator door gasket body 606 and liner 224 with ribbing to allow the deformation.

Figure 12:
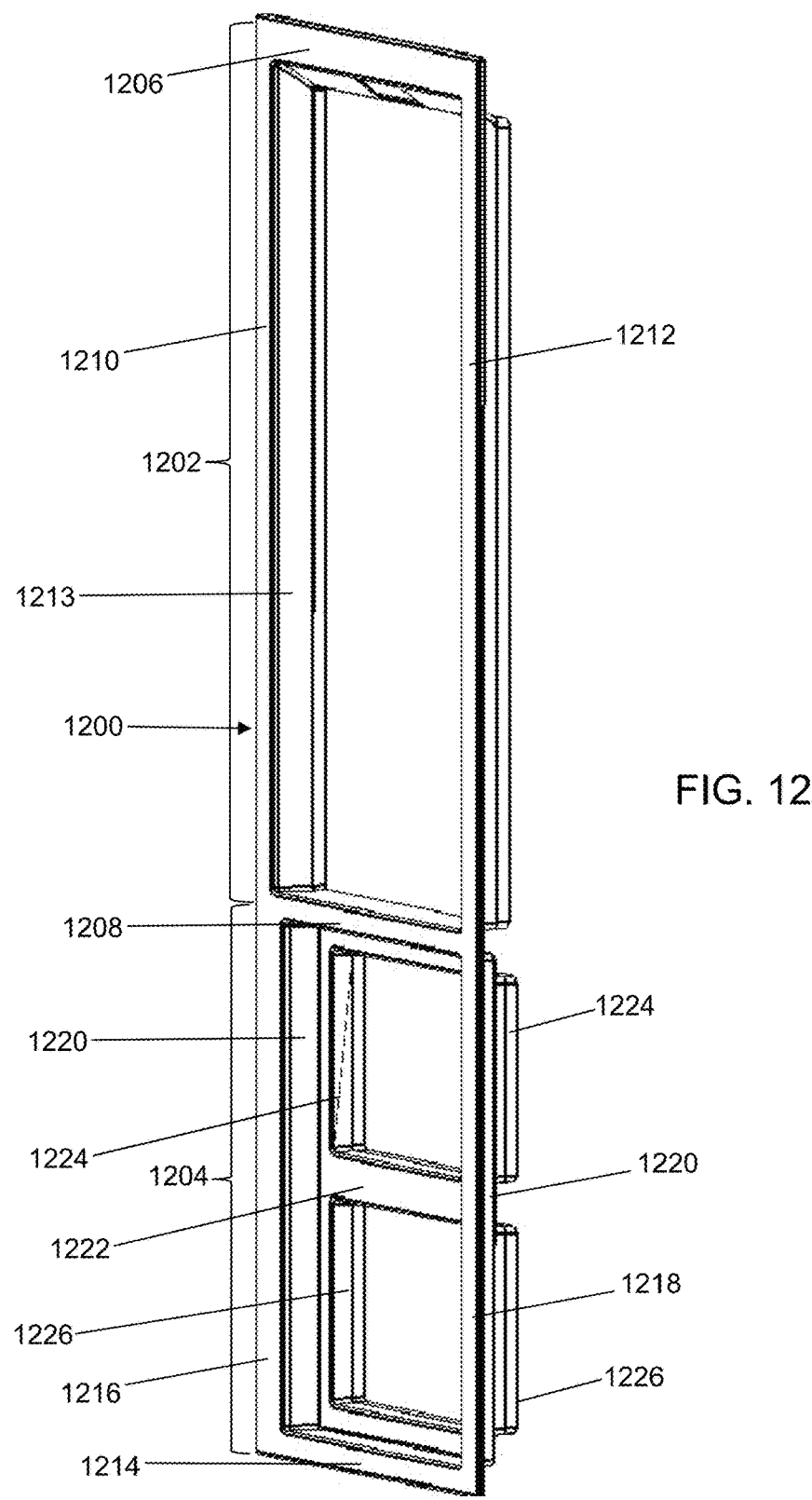
FIG. 12 depicts a front, perspective view of a frame of the refrigerator body of FIG. 3 in accordance with an illustrative embodiment.

With reference to FIG. 12, a front, perspective view of a frame 1200 is shown in accordance with an illustrative embodiment. Frame 1200 fits between top wall 108, right side wall 110, left side wall 112, and bottom wall 114 and may be formed of a single piece of material or multiple pieces of material. Frame 1200 may include a top frame 1202 and a bottom frame 1204. Top frame 1202 includes a top frame wall 1206, a divider frame wall 1208, a left top frame wall 1210, and a right top frame wall 1212 that define a refrigerator compartment aperture wall 1213 for refrigerator compartment 202. Refrigerator compartment aperture wall 1213 extends towards an interior of refrigerator body 118 from top frame wall 1206, divider frame wall 1208, left top frame wall 1210, and right top frame wall 1212.

Bottom frame 1204 includes a bottom frame wall 1214, divider frame wall 1208, a left bottom frame wall 1216, and a right bottom frame wall 1218 that define a freezer compartment aperture wall 1220 for freezer compartment 200. Left top frame wall 1210 and left bottom frame wall 1216 may form a continuous wall. In the illustrative embodiment, left bottom frame wall 1216 is wider than left top frame wall 1210. Right top frame wall 1212 and right bottom frame wall 1218 may form a continuous wall. In the illustrative embodiment, right bottom frame wall 1218 is wider than right top frame wall 1212.

Freezer compartment aperture wall 1220 extends towards an interior of refrigerator body 118 from bottom frame wall 1214, divider frame wall 1208, left bottom frame wall 1216, and right bottom frame wall 1218. A freezer drawer liner wall 1222 extends from freezer compartment aperture wall 1220 to form a top drawer aperture wall 1224 for top drawer 206 and a bottom drawer aperture 1226 for bottom drawer 208.

Figure 13:
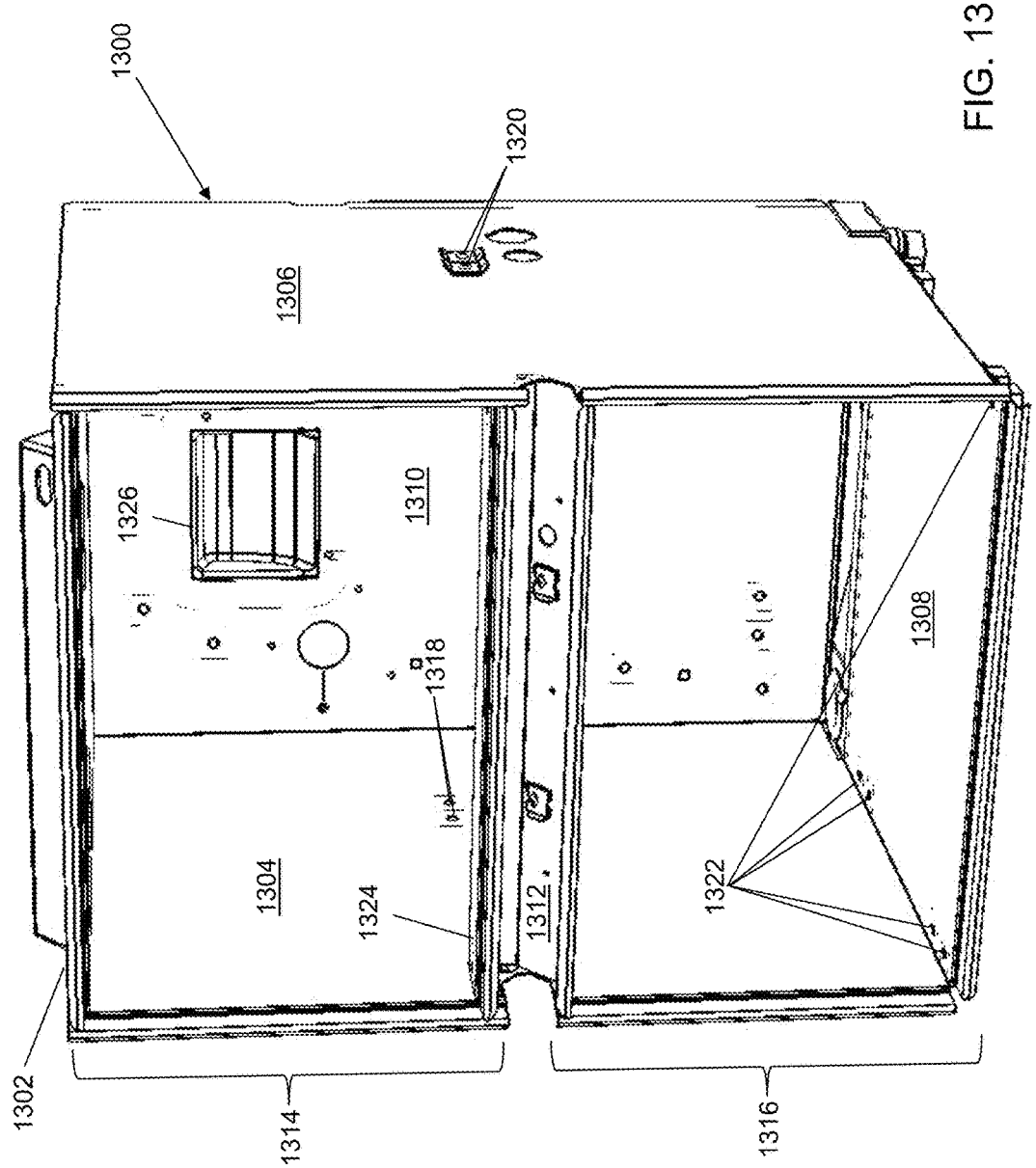
FIG. 13 depicts a front, perspective view of a freezer drawer housing of the refrigerator body of FIG. 3 in accordance with an illustrative embodiment.

With reference to FIG. 13, a front, perspective view of a freezer drawer housing 1300 is shown in accordance with an illustrative embodiment. Freezer drawer housing 1300 mounts within freezer compartment 200 of refrigerator body 118 between left side wall 110, right side wall 112, bottom wall 114, and divider wall 204. Freezer drawer housing 1300 may include a freezer drawer top wall 1302, a freezer drawer left side wall 1304, a freezer drawer right side wall 1306, a freezer drawer bottom wall 1308, a freezer drawer back wall 1310, and a divider support wall 1312. The cooling components introduce cold air into freezer compartment 200 though a vent cover 1326 mounted to freezer drawer back wall 1310.

Freezer drawer top wall 1302, freezer drawer left side wall 1304, freezer drawer right side wall 1306, freezer drawer back wall 1310, and divider support wall 1312 define a top freezer drawer aperture 1314. Freezer drawer left side wall 1304, freezer drawer right side wall 1306, freezer drawer bottom wall 1308, freezer drawer back wall 1310, and divider support wall 1312 define a bottom freezer drawer aperture 1316. Top drawer aperture wall 1224 for top drawer 206 slides into top freezer drawer aperture 1314. Bottom drawer aperture 1226 for bottom drawer 208 slides into bottom freezer drawer aperture 1316.

In the illustrative embodiment of FIG. 13, back, left, top freezer drawer fastener apertures 1318 are formed through freezer drawer left side wall 1304; back, right, top freezer drawer fastener apertures 1320 are formed through freezer drawer right side wall 1306; and bottom freezer drawer fastener apertures 1322 are formed through freezer drawer bottom wall 1308. Though not visible, one or more front, left, top freezer drawer fastener apertures and one or more front, right, top freezer drawer fastener apertures are formed through a top surface 1324 of divider support wall 1312. In the illustrative embodiment, the bottom freezer drawer fastener apertures 1322 include four apertures along a left side of freezer drawer bottom wall 1308 and four apertures along a right side of freezer drawer bottom wall 1308 though only one aperture is visible along the right side.

Figure 14:
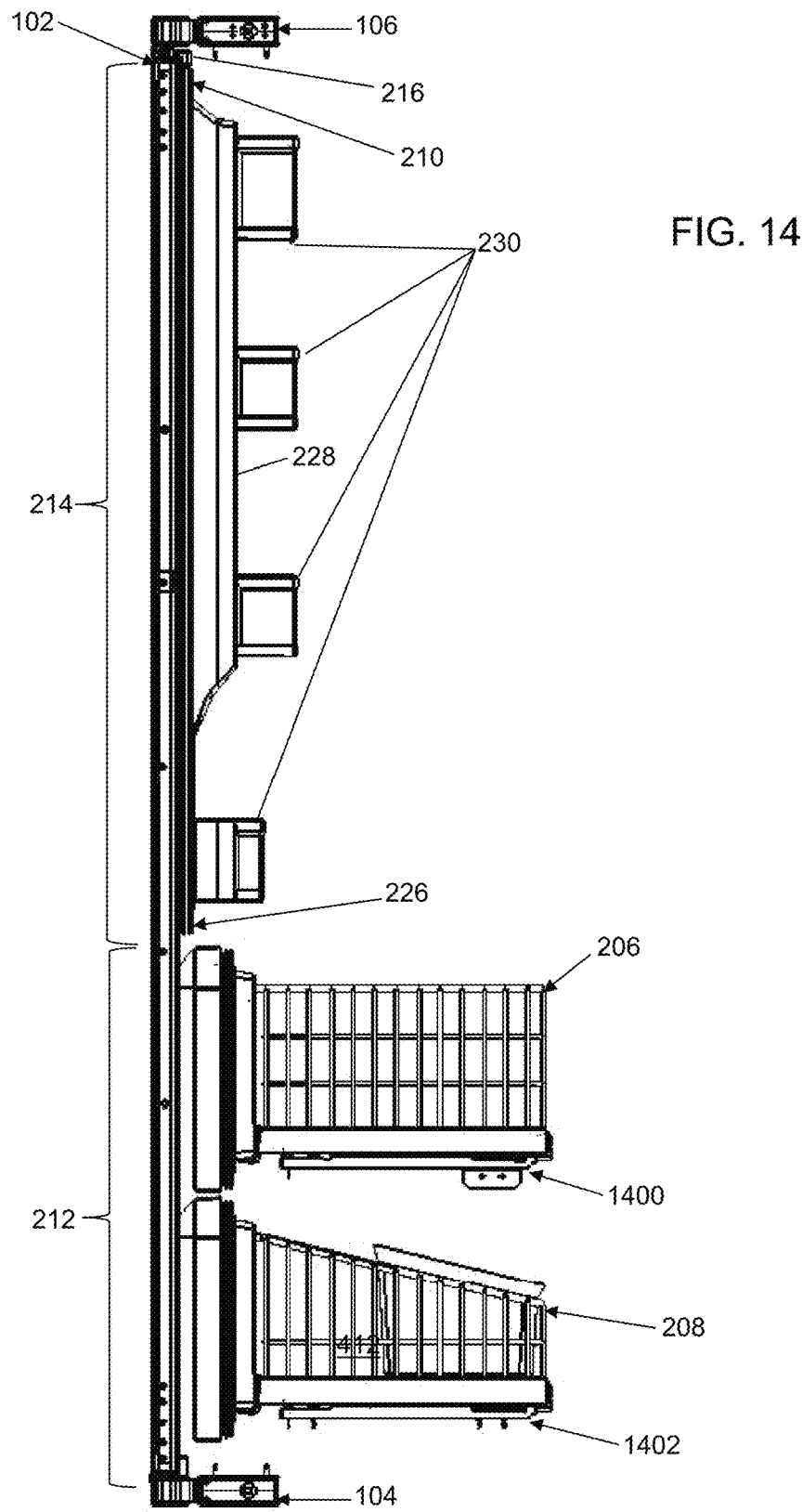
FIG. 14 depicts a right side view of the door, a top drawer, and a bottom drawer of a freezer compartment of the refrigerator of FIG. 1 in accordance with an illustrative embodiment with the door in the closed position.
Figure 15:
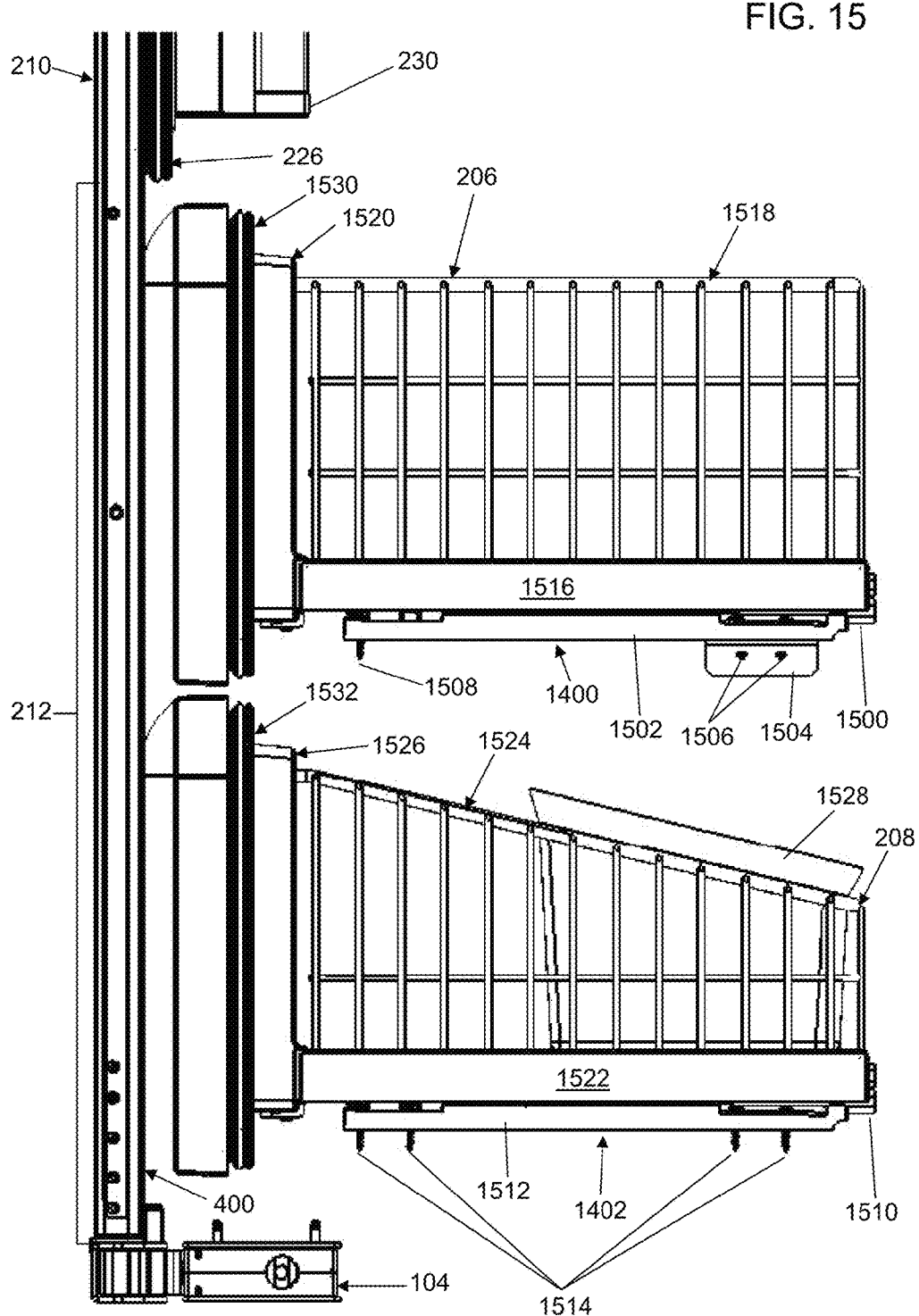
FIG. 15 depicts a zoomed, right side view of the door, the top drawer, and the bottom drawer of the freezer compartment of the refrigerator of FIG. 1 in accordance with an illustrative embodiment with the door in the closed position.
Figure 16:
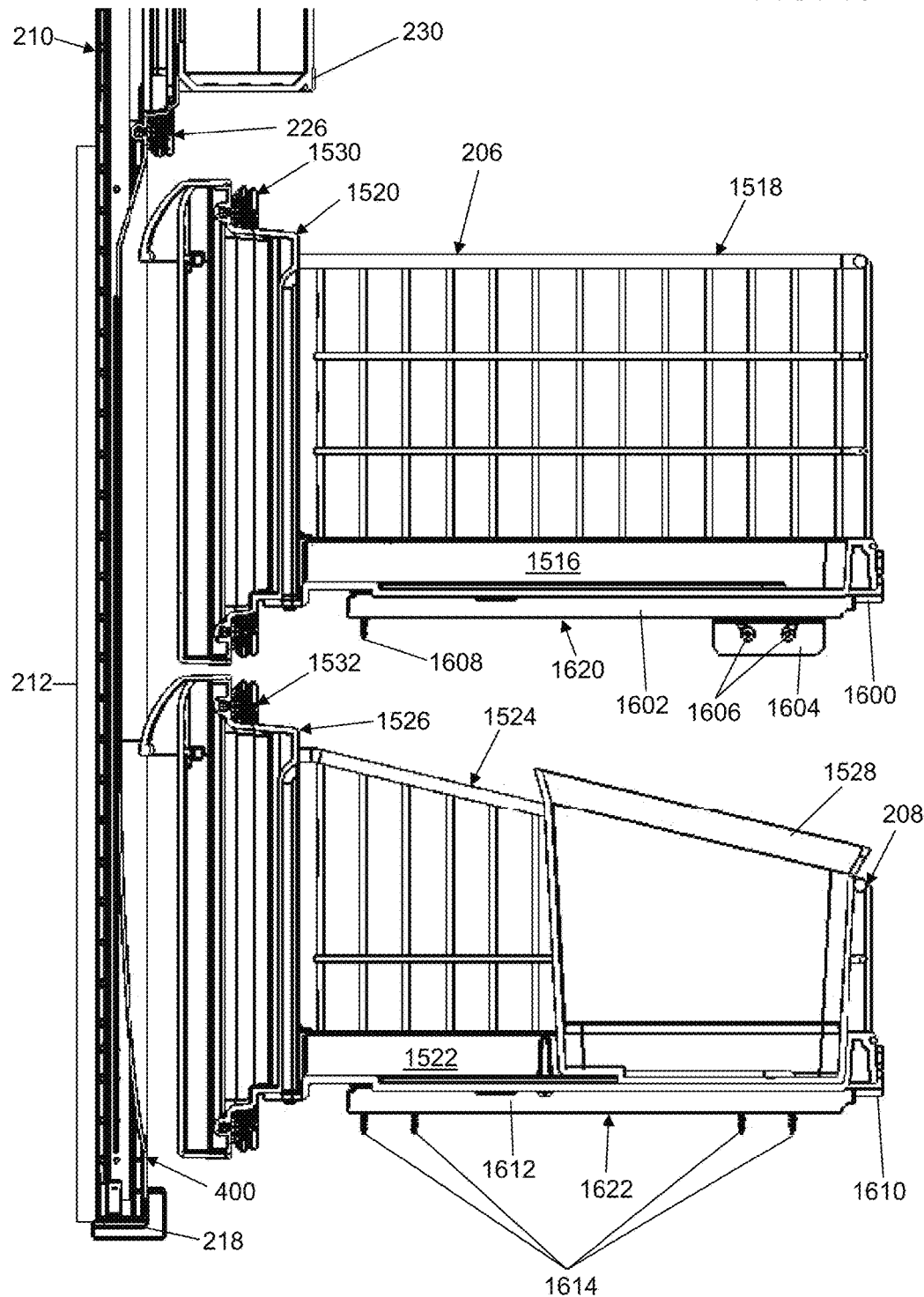
FIG. 16 depicts a right, zoomed, cross sectional view of the door, the top drawer, and the bottom drawer of the freezer compartment of the refrigerator of FIG. 1 in accordance with an illustrative embodiment with the door in the closed position.
Figure 17:
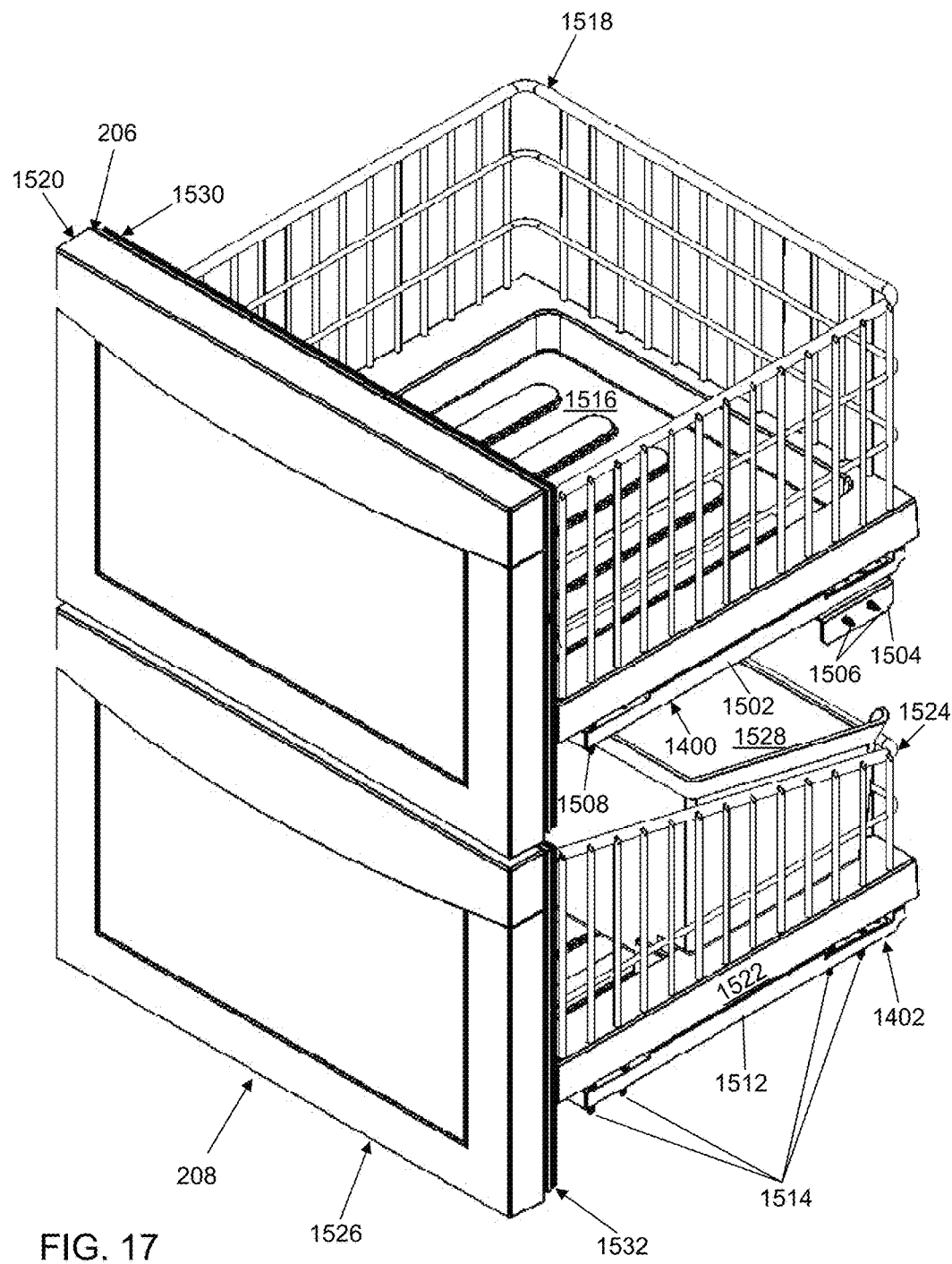
FIG. 17 depicts a front perspective view of the top drawer and the bottom drawer of FIG. 12 in accordance with an illustrative embodiment.

With reference to FIG. 14, a right side view of door 102, top drawer 206, and bottom drawer 208 is shown in accordance with an illustrative embodiment with door 102 in a closed position. With reference to FIG. 15, a zoomed, right side view of door 102, top drawer 206, and bottom drawer 208 is shown in accordance with an illustrative embodiment with door 102 in a closed position. With reference to FIG. 16, a right, zoomed, cross sectional view of door 102, top drawer 206, and bottom drawer 208 is shown in accordance with an illustrative embodiment with door 102 in a closed position. With reference to FIG. 17, a front perspective view of top drawer 206 and bottom drawer 208 is shown in accordance with an illustrative embodiment. When door 102 is in a closed position, the handles of top drawer 206 and bottom drawer 208 extend into depression 404.

Top drawer 206 may include a top drawer base 1516, top drawer container walls 1518, and a top drawer panel 1520. Bottom drawer 208 may include a bottom drawer base 1522, bottom drawer container walls 1524, a bottom drawer panel 1526, and an ice bin 1528. Ice bin 1528 may be positioned within bottom drawer container walls 1524 to catch ice from an ice maker/dispenser (not shown). The ice maker/dispenser may be mounted within freezer compartment 200 to make and store ice in ice bin 1528.

A left, top drawer mounting mechanism 1620 and a right, top drawer mounting mechanism 1400 are mounted to a left and a right side, respectively, of top drawer base 1516, for example, using fasteners such as screws or rivets. A right, bottom freezer drawer mounting mechanism 1402 and a left, bottom freezer drawer mounting mechanism 1622 are mounted to a left and a right side, respectively, of bottom drawer base 1522, for example, using fasteners such as screws or rivets.

Left, top drawer mounting mechanism 1620 may include a top, left slide 1600, a top, left slide bracket 1602, a top, left slide fastener bracket 1604, top, left slide back fasteners 1606, and a top, left slide front fastener 1608. Right, top drawer mounting mechanism 1400 may include a top, right slide 1500, a top, right slide bracket 1502, a top, right slide fastener bracket 1504, top, right slide back fasteners 1506, and a top, right slide front fastener 1508. Top drawer base 1516 mounts to top, left slide 1600 and top, right slide 1500. Top drawer 206 slides open and closed as top, left slide 1600 and top, right slide 1500 slide within top, left slide bracket 1602 and top, right slide bracket 1502, respectively.

Left, bottom drawer mounting mechanism 1622 may include a bottom, left slide 1610, a bottom, left slide bracket 1612, and bottom, left slide fasteners 1614. Right, bottom drawer mounting mechanism 1402 may include a bottom, right slide 1510, a bottom, right slide bracket 1512, and bottom, right slide fasteners 1514. Bottom drawer base 1522 mounts to bottom, left slide 1610 and bottom, right slide 1510. Bottom drawer 208 slides open and closed as bottom, left slide 1610 and bottom, right slide 1510 slide within bottom, left slide bracket 1612 and bottom, right slide bracket 1512, respectively.

Top, left slide back fasteners 1606 are inserted through apertures in top, left slide fastener bracket 1604 aligned with back, left, top freezer drawer fastener apertures 1318 to mount top, left slide 1600 to freezer drawer left side wall 1304. Top, right slide back fasteners 1506 are inserted through apertures in top, right slide fastener bracket 1504 aligned with back, right, top freezer drawer fastener apertures 1320 to mount top, right slide 1500 to freezer drawer right side wall 1306. Top, left slide front fastener 1608 is inserted through an aperture in top, left slide bracket 1602 aligned with the one or more front, left, top freezer drawer fastener apertures formed through top surface 1324 of divider support wall 1312 to mount top, left slide 1600 to divider support wall 1312. Top, right slide front fastener 1508 is inserted through an aperture in top, right slide bracket 1502 aligned with the one or more front, right, top freezer drawer fastener apertures formed through top surface 1324 of divider support wall 1312 to mount top, right slide 1500 to divider support wall 1312.

Bottom, left slide fasteners 1614 are inserted through apertures in bottom, left slide bracket 1612 aligned with bottom freezer drawer fastener apertures 1322 to mount bottom, left slide 1610 to freezer drawer bottom wall 1308. Bottom, right slide fasteners 1514 are inserted through apertures in bottom, right slide bracket 1512 aligned with bottom freezer drawer fastener apertures 1322 to mount bottom, right slide 1510 to freezer drawer bottom wall 1308.

Top drawer container walls 1518 and top drawer base 1516 fit within top drawer aperture wall 1224 when top drawer 206 is slid open and closed. When top drawer 206 is in a closed position, a top drawer gasket 1530 seals top drawer 206 against freezer drawer liner wall 1222.

Bottom drawer container walls 1524 and bottom drawer base 1522 fit within bottom drawer aperture 1226 when bottom drawer 208 is slid open and closed. When bottom drawer 208 is in a closed position, a bottom drawer gasket 1532 seals bottom drawer 208 against freezer drawer liner wall 1222. Top drawer gasket 1530 may be identical to bottom drawer gasket 1532 though this is not required. For example, top drawer panel 1520 may have a different size and shape than bottom drawer panel 1526.

In the illustrative embodiment of FIGS. 14-17, top drawer container walls 1518 form three-sides of a square or rectangle shape when viewed from above though top drawer container walls 1518 may form other shapes. Top drawer container walls 1518 mount to top drawer panel 1520 and to top drawer base 1516 as described further below. Top drawer container walls 1518 include a wire mesh so that air introduced into freezer compartment 200 can circulate into an interior of top drawer container walls 1518.

Similarly, bottom drawer container walls 1524 form three-sides of a square or rectangle shape when viewed from above though bottom drawer container walls 1524 may form other shapes. Bottom drawer container walls 1524 mount to bottom drawer panel 1526 and to bottom drawer base 1522 as described further below. Bottom drawer container walls 1524 include a wire mesh so that air introduced into freezer compartment 200 can circulate into an interior of bottom drawer container walls 1524.

Bottom drawer container walls 1524 slope downward from front to back; whereas, top drawer container walls 1518 are level though neither is required. In the illustrative embodiment, bottom drawer container walls 1524 slope downward from front to back to accommodate the ice maker. Top drawer 206 may otherwise be identical to bottom drawer 208 such that top drawer panel 1520 is identical to bottom drawer panel 1526, and top drawer base 1516 is identical to bottom drawer base 1522 though top, right slide 1500 and top, left slide 1600 are configured to mount to freezer drawer right side wall 1306 and freezer drawer left side wall 1304, respectively; whereas, bottom, right slide 1510 and bottom, left slide 1610 are configured to mount to freezer drawer bottom wall 1308.

Figure 18:
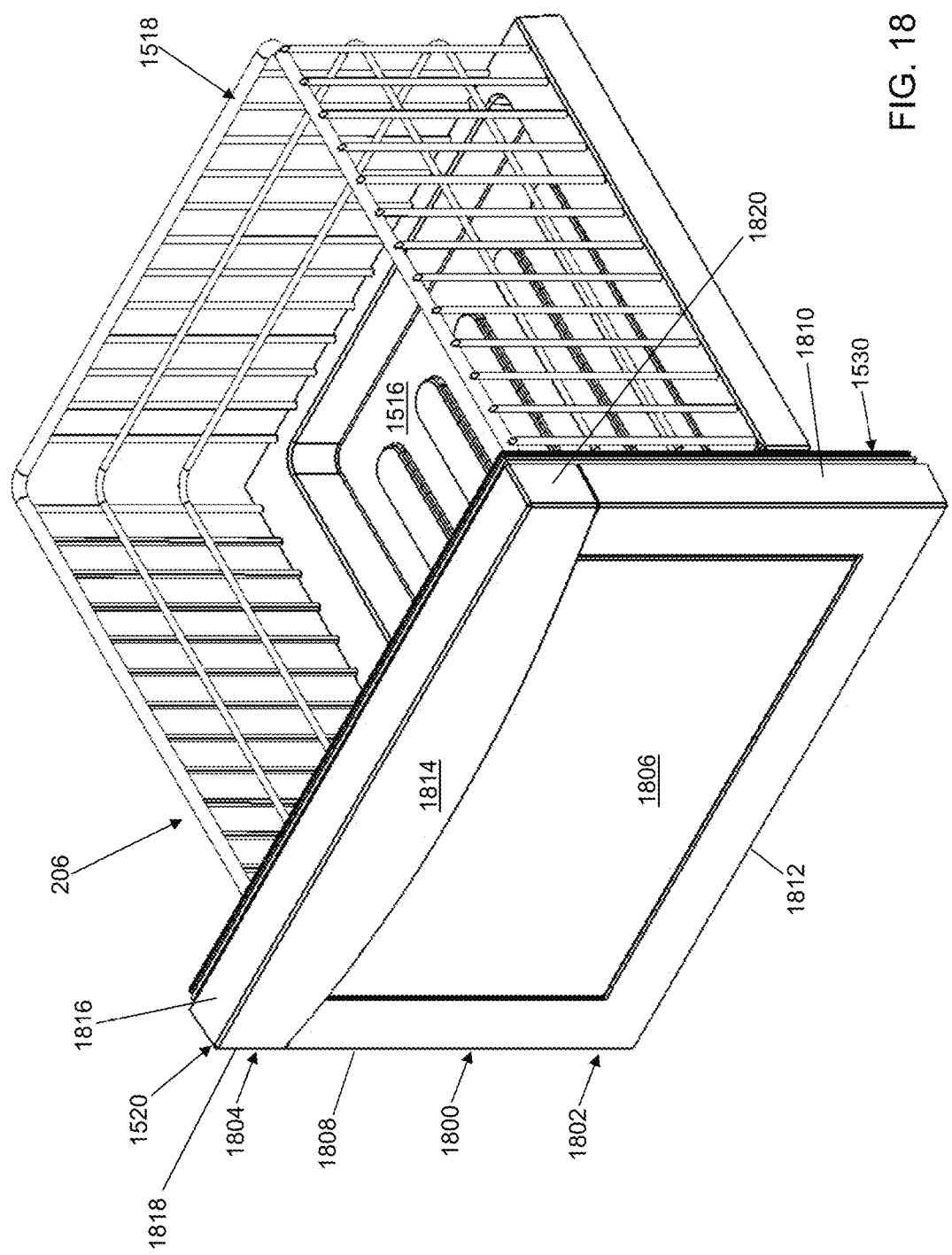
FIG. 18 depicts a front perspective view of the top drawer of FIG. 12 in accordance with an illustrative embodiment.
Figure 19:
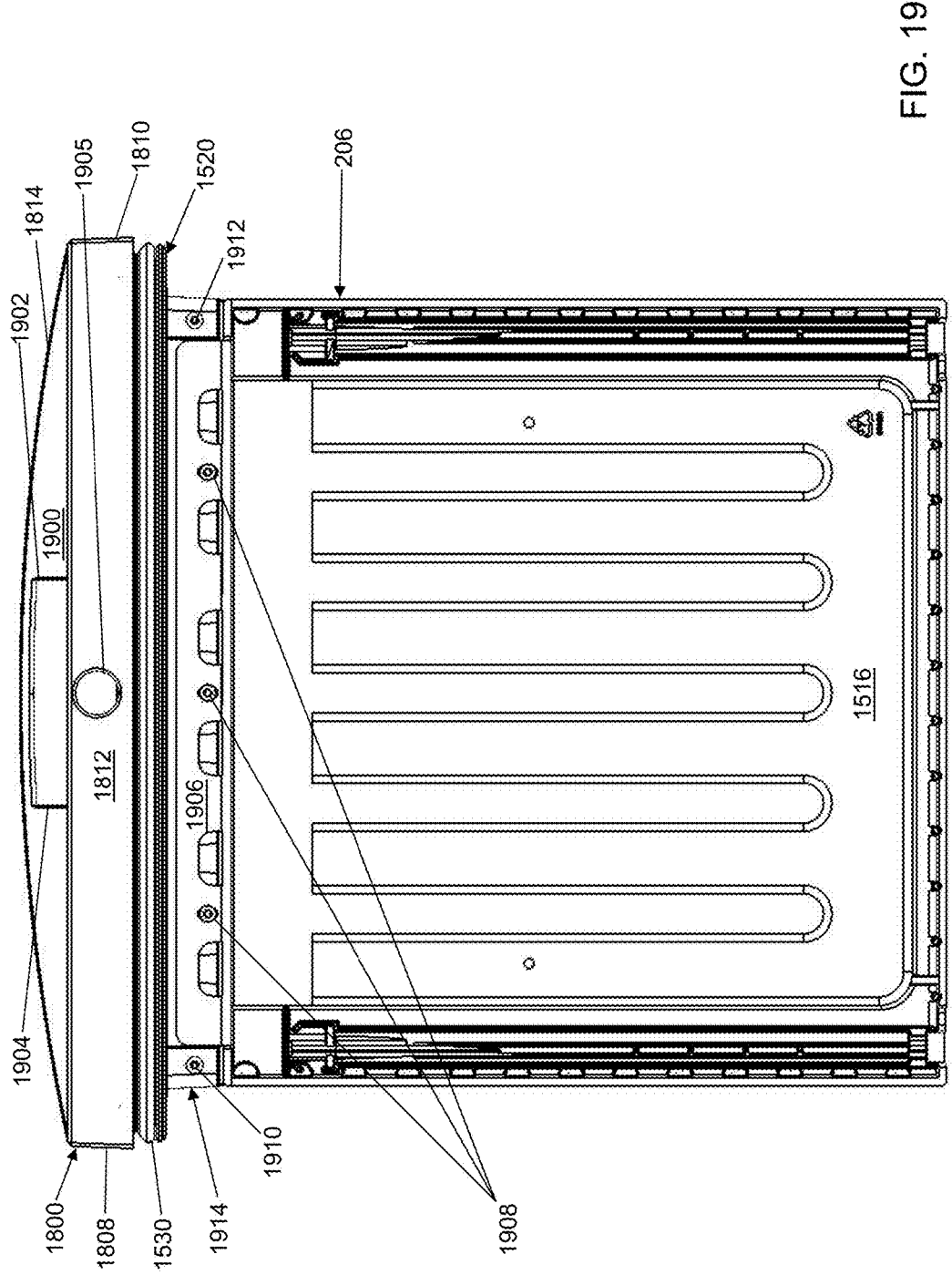
FIG. 19 depicts a bottom view of the top drawer of FIG. 12 in accordance with an illustrative embodiment.
Figure 20:
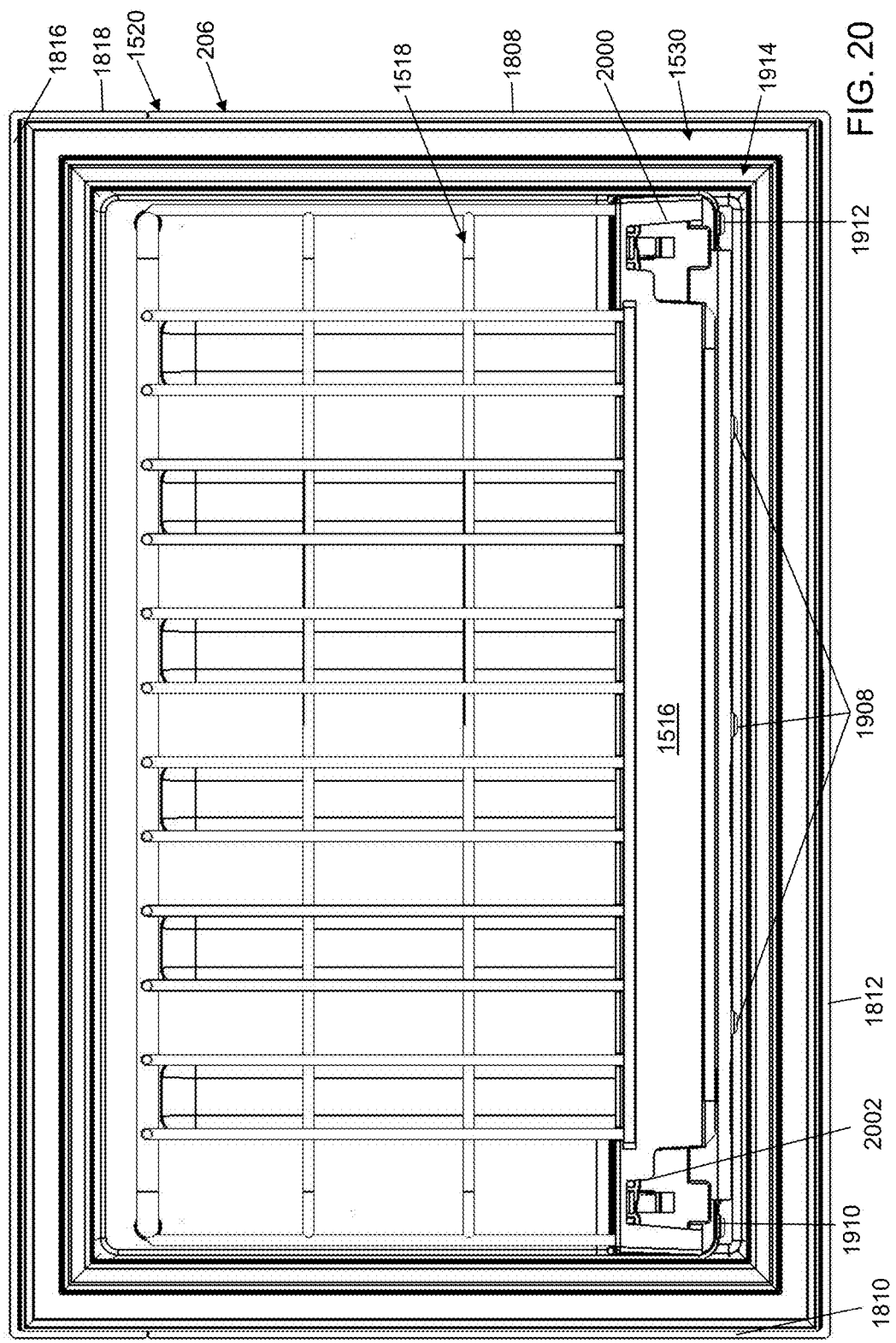
FIG. 20 depicts a back view of the top drawer of FIG. 12 in accordance with an illustrative embodiment.
Figure 21:
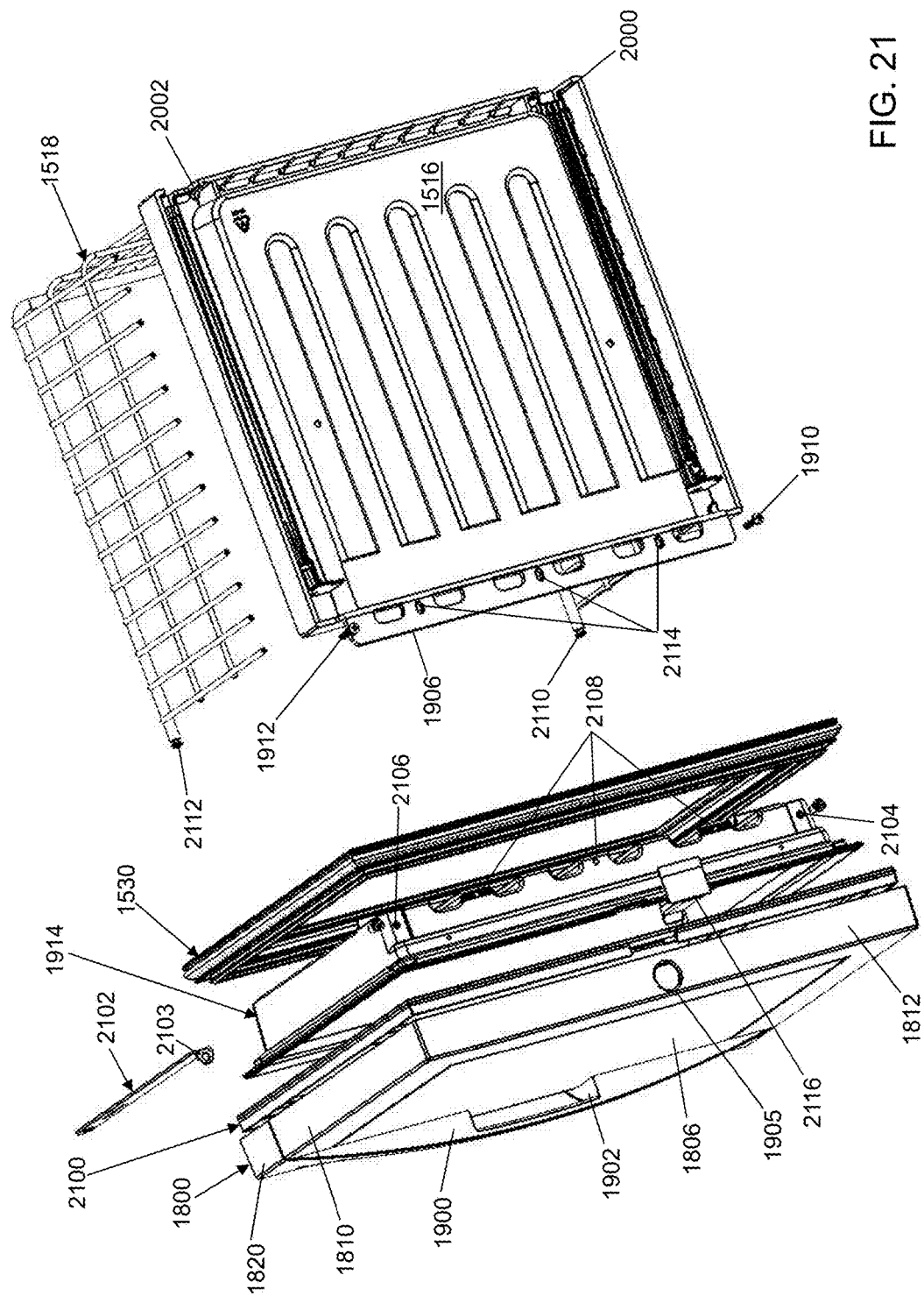
FIG. 21 depicts a bottom perspective, exploded view of the top drawer of FIG. 12 in accordance with an illustrative embodiment.
Figure 22:
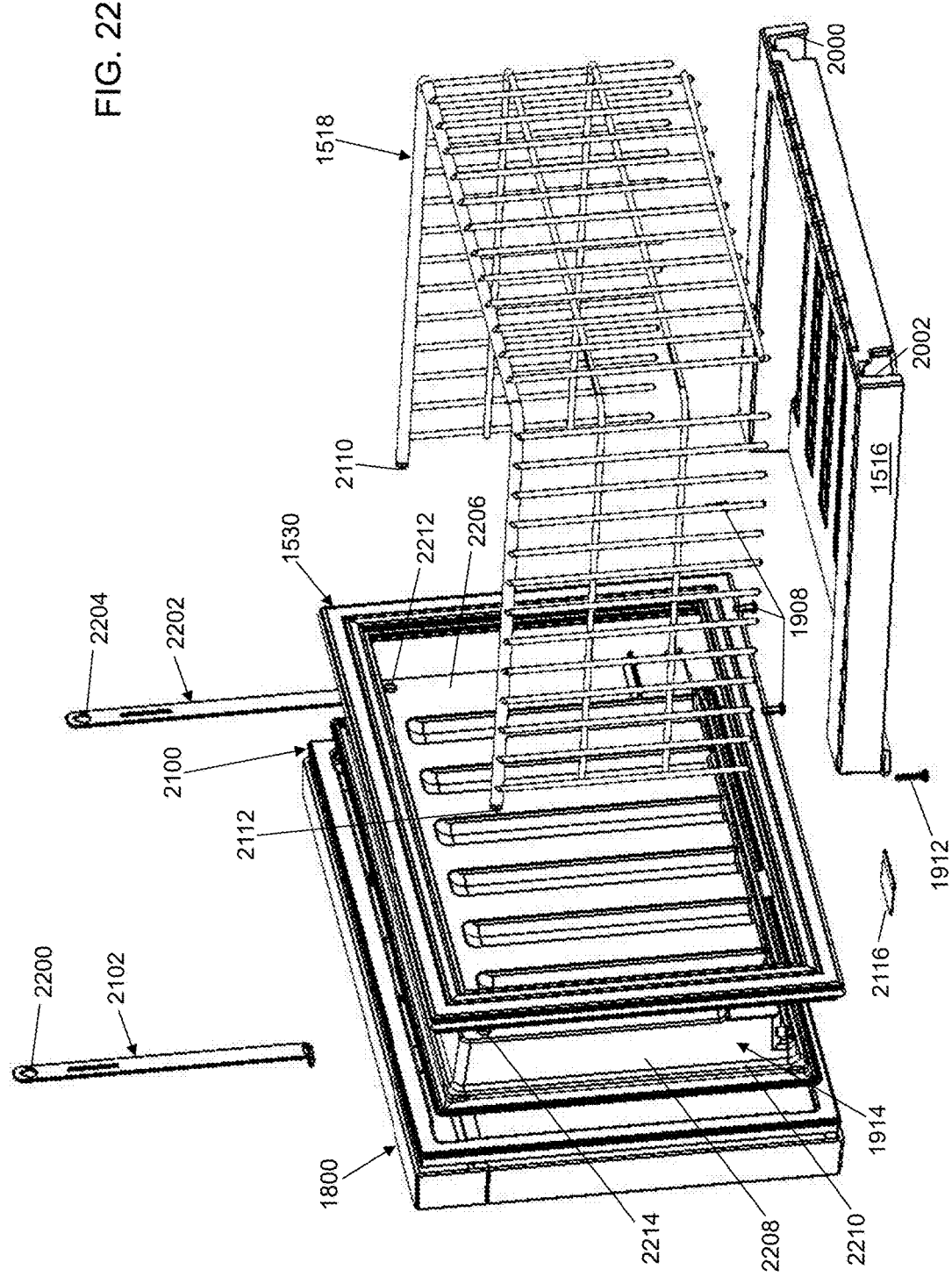
FIG. 22 depicts a right perspective, exploded view of the top drawer of FIG. 12 in accordance with an illustrative embodiment.
Figure 23:
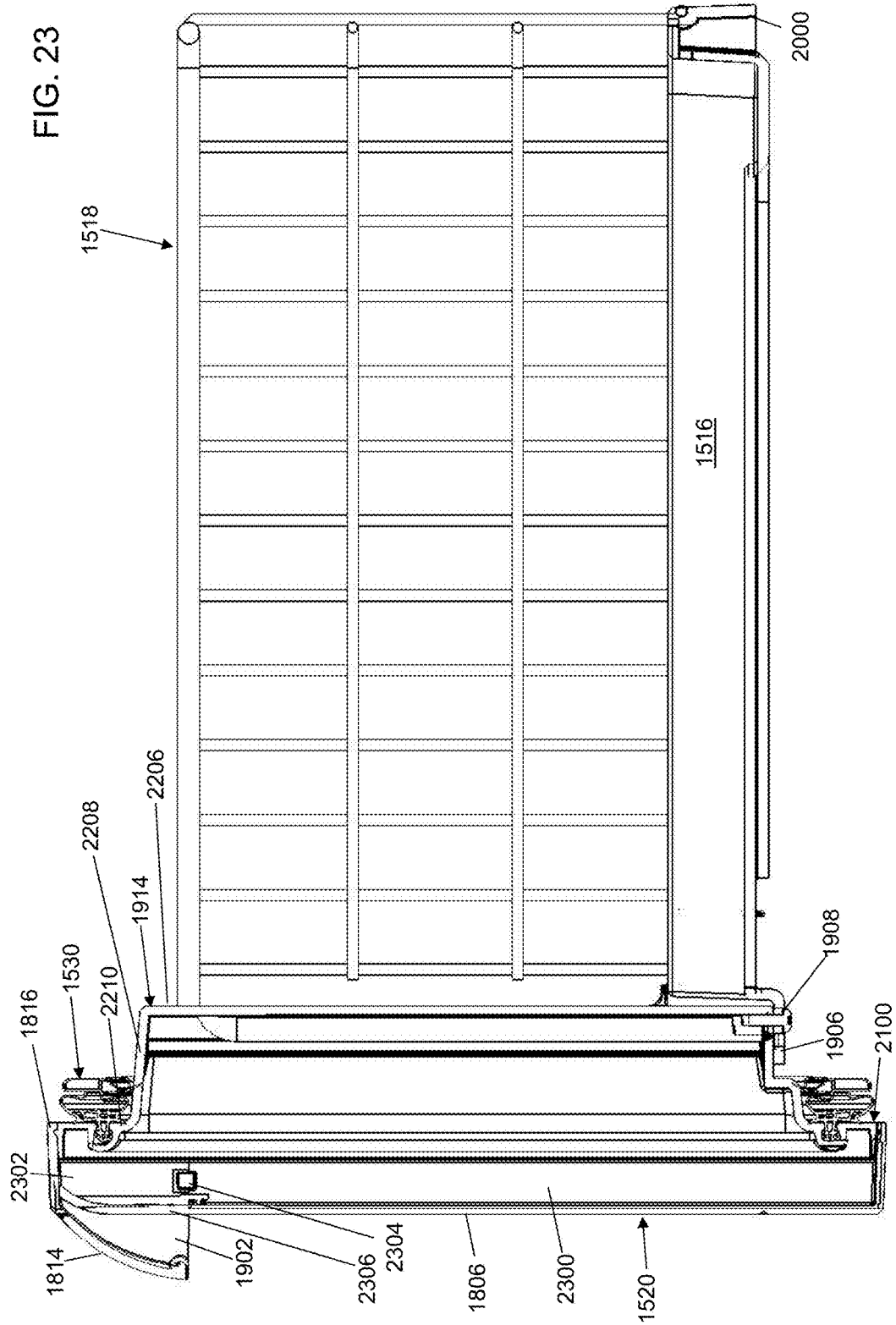
FIG. 23 depicts a right perspective, cross sectional view of the top drawer of FIG. 12 in accordance with an illustrative embodiment.

With reference to FIG. 18, a front perspective view of top drawer 206 is shown in accordance with an illustrative embodiment. With reference to FIG. 19, a bottom view of top drawer 206 is shown in accordance with an illustrative embodiment. With reference to FIG. 20, a back view of top drawer 206 is shown in accordance with an illustrative embodiment. With reference to FIG. 21, a bottom perspective, exploded view of top drawer 206 is shown in accordance with an illustrative embodiment. With reference to FIG. 22, a right perspective, exploded view of top drawer 206 is shown in accordance with an illustrative embodiment. With reference to FIG. 23, a right perspective, cross sectional view of top drawer 206 is shown in accordance with an illustrative embodiment.

Top drawer panel 1520 of top drawer 206 may include top drawer gasket 1530, a panel face shell 1800, a liner shell 1914, and a ring wall 2100 mounted to each other. In the illustrative embodiment, top drawer container walls 1518 and top drawer base 1516 mount to liner shell 1914 of top drawer panel 1520. Panel face shell 1800 may include a front shell 1802 and a handle shell 1804. In an illustrative embodiment, front shell 1802 and handle shell 1804 are different pieces joined together though front shell 1802 and handle shell 1804 may be integrally formed together, for example, by molding.

Figure 24:
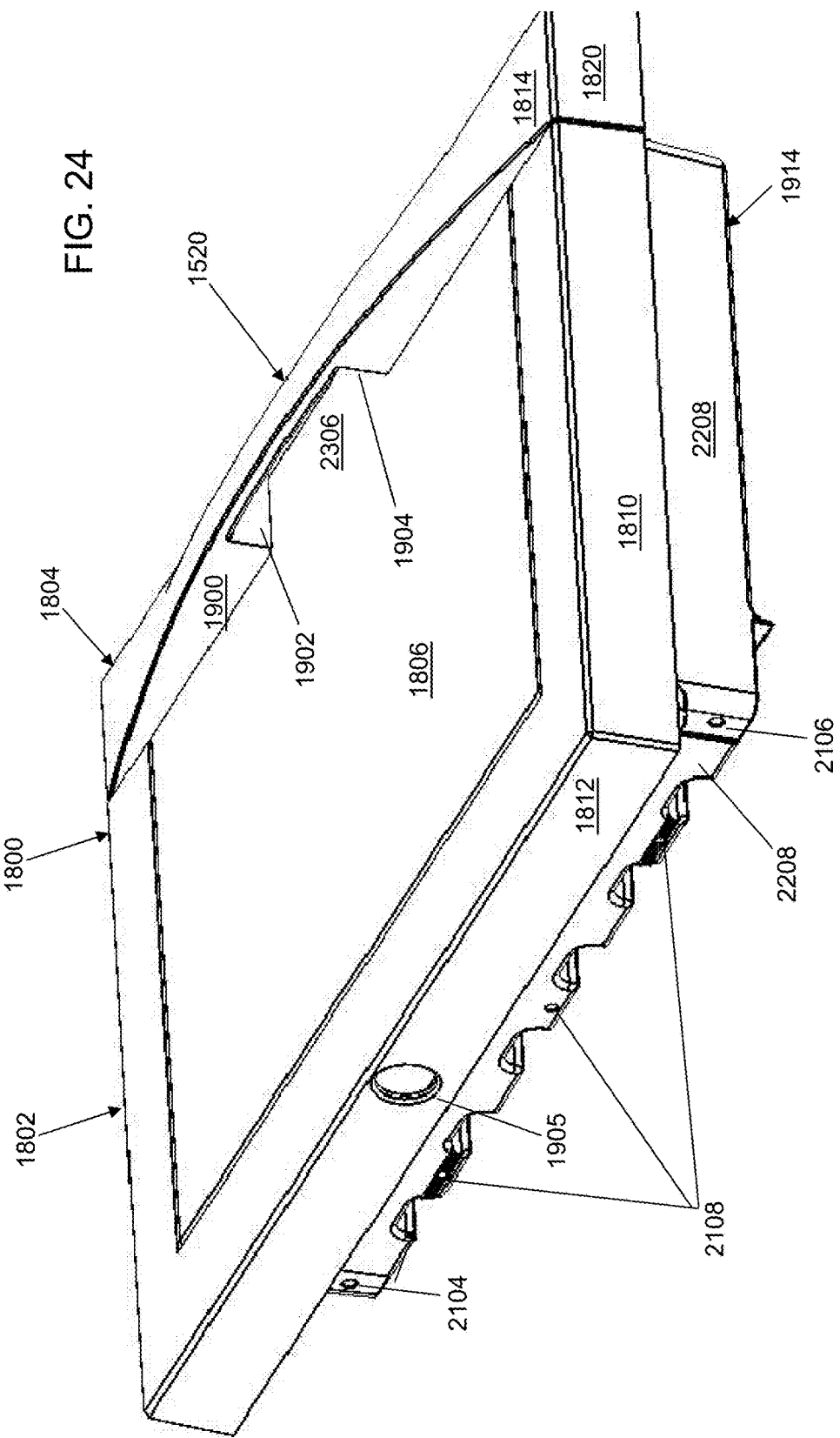
FIG. 24 depicts a top perspective view of a top drawer panel of the top drawer of FIG. 12 in accordance with an illustrative embodiment.
Figure 25:
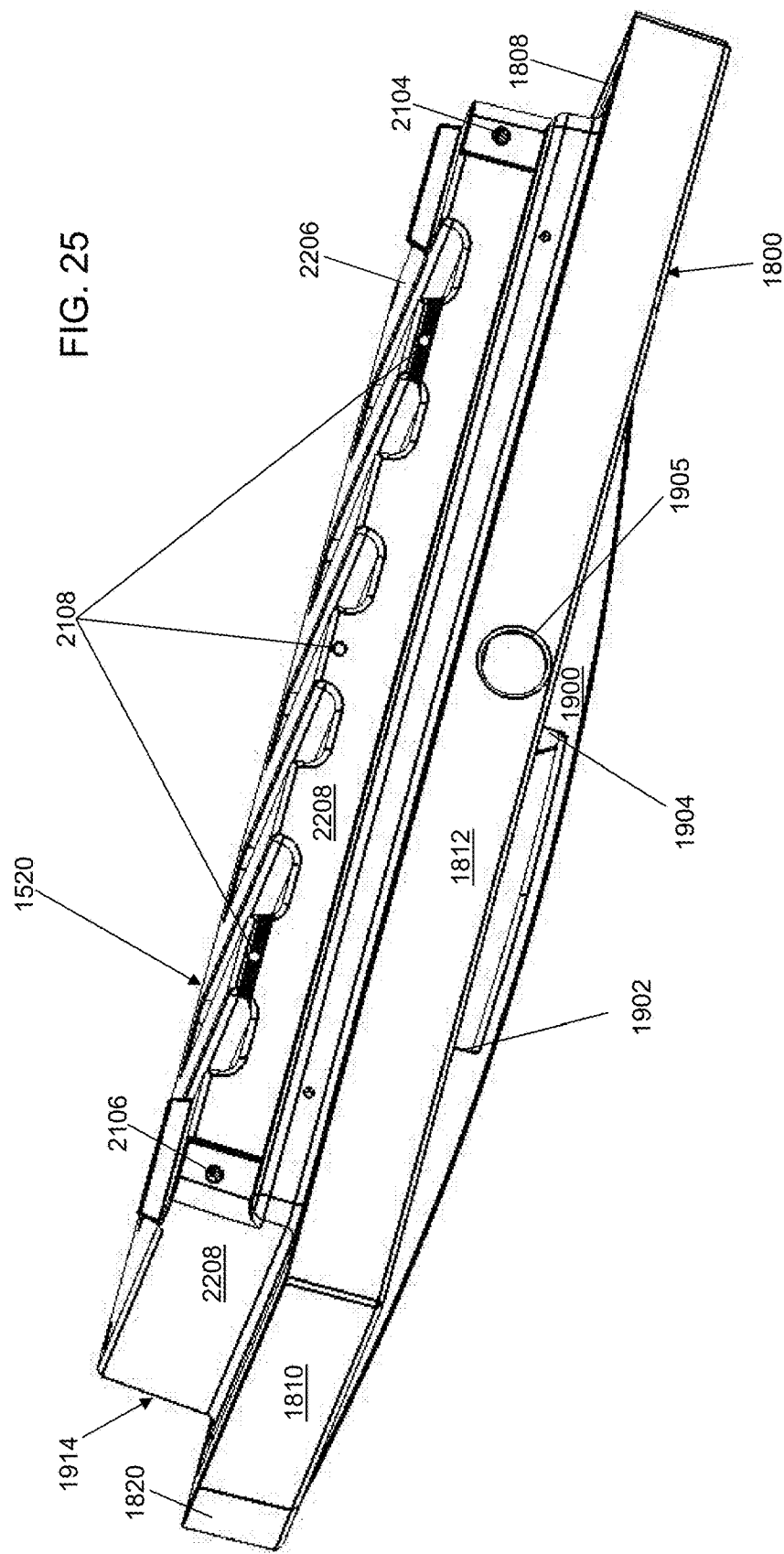
FIG. 25 depicts a bottom perspective view of the top drawer panel of FIG. 24 in accordance with an illustrative embodiment.
Figure 26:
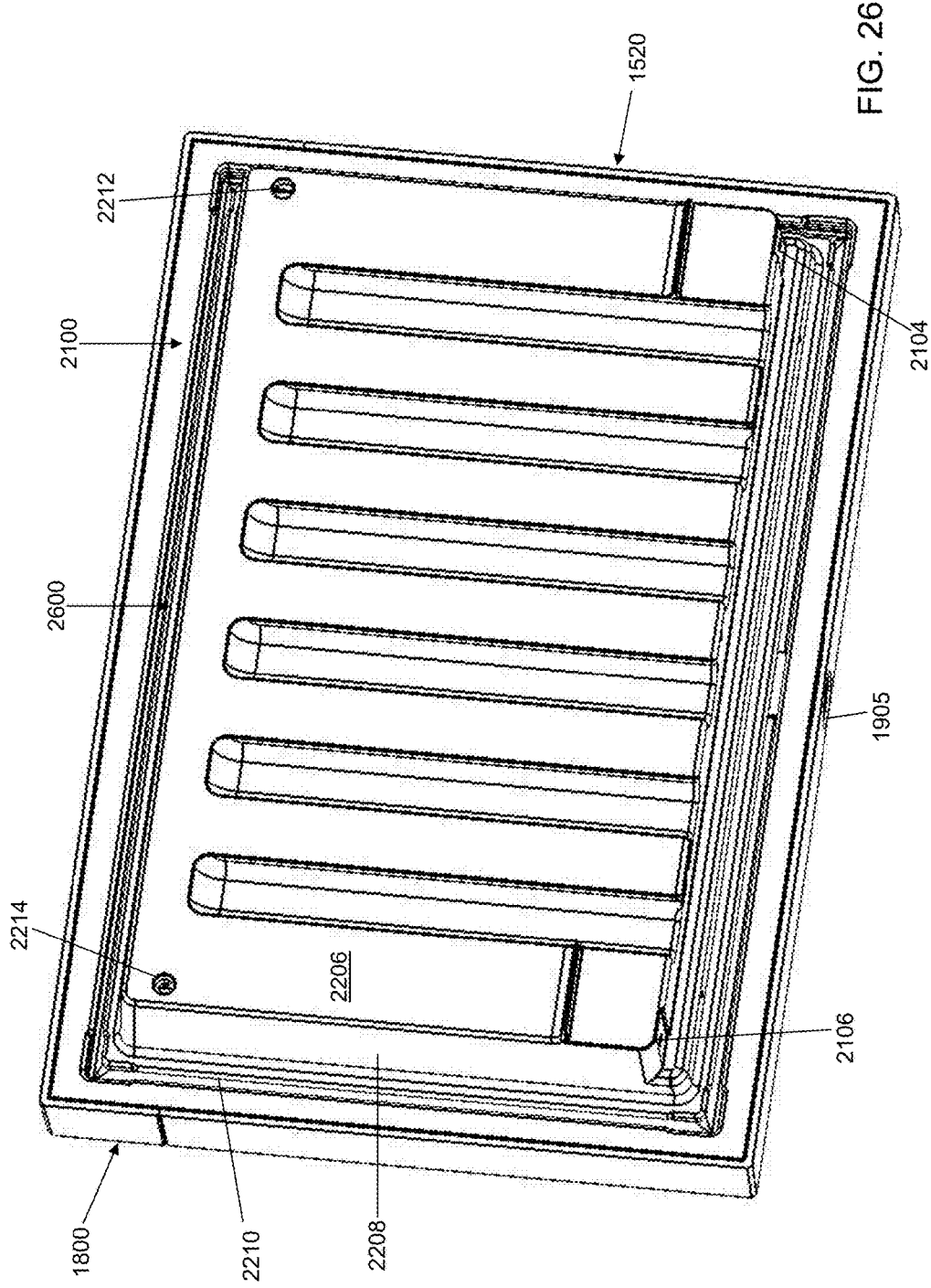
FIG. 26 depicts a back perspective view of the top drawer panel of FIG. 24 in accordance with an illustrative embodiment.
Figure 27:
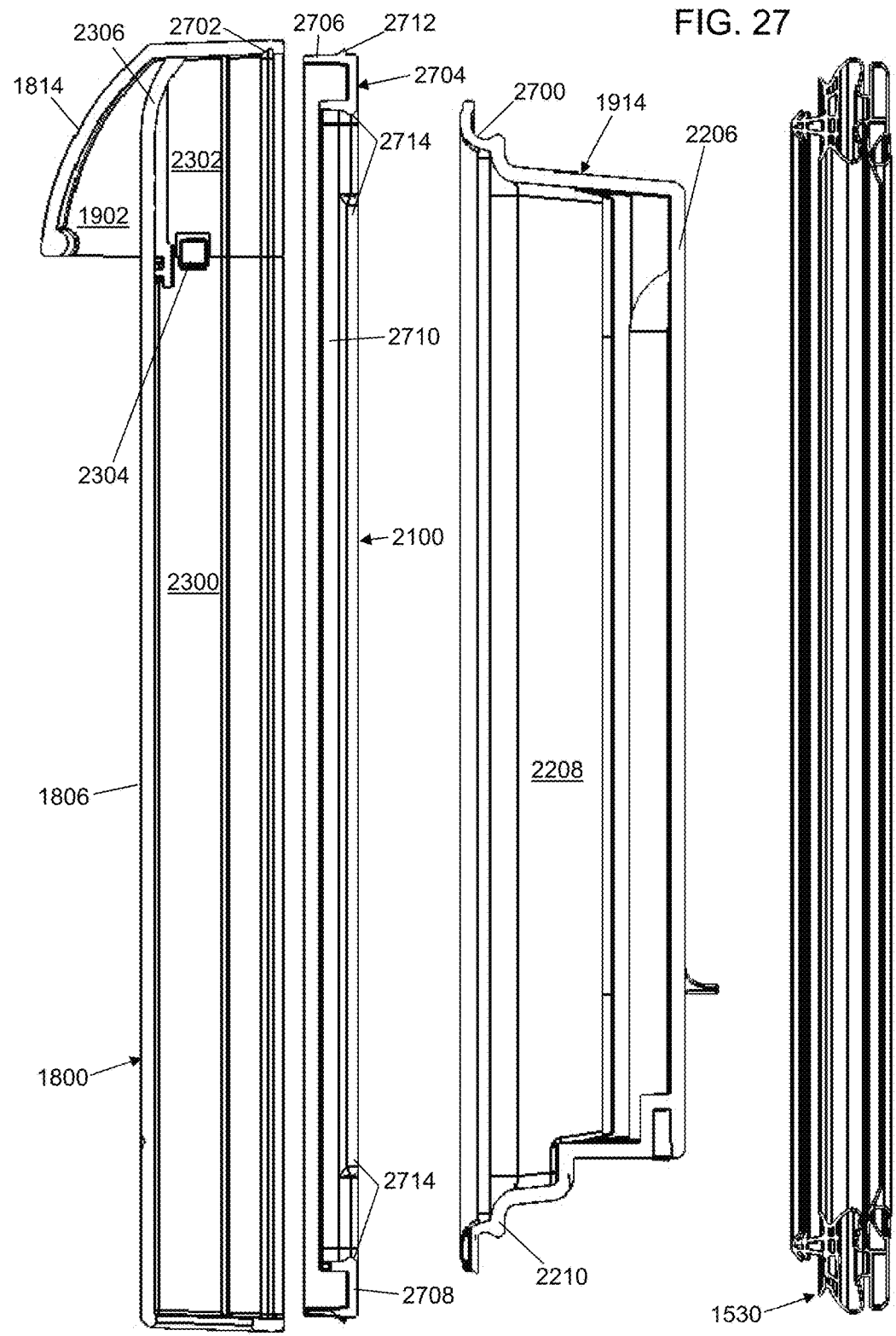
FIG. 27 depicts a right exploded, cross sectional view of the top drawer panel of FIG. 24 in accordance with an illustrative embodiment.
Figure 30A:
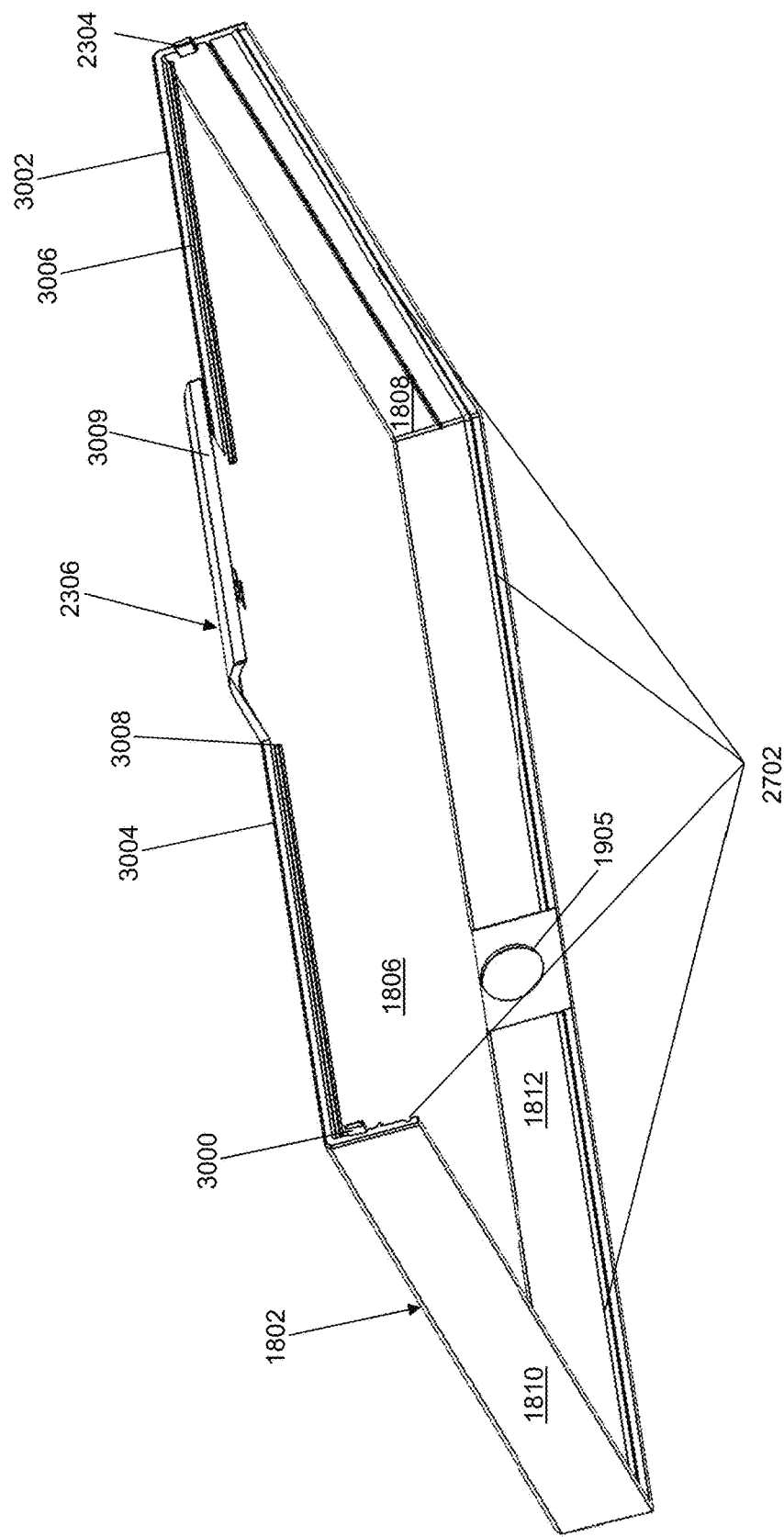
FIG. 30A depicts a back, right perspective view of a front shell of the top drawer panel of FIG. 24 in accordance with an illustrative embodiment.
Figure 30B:
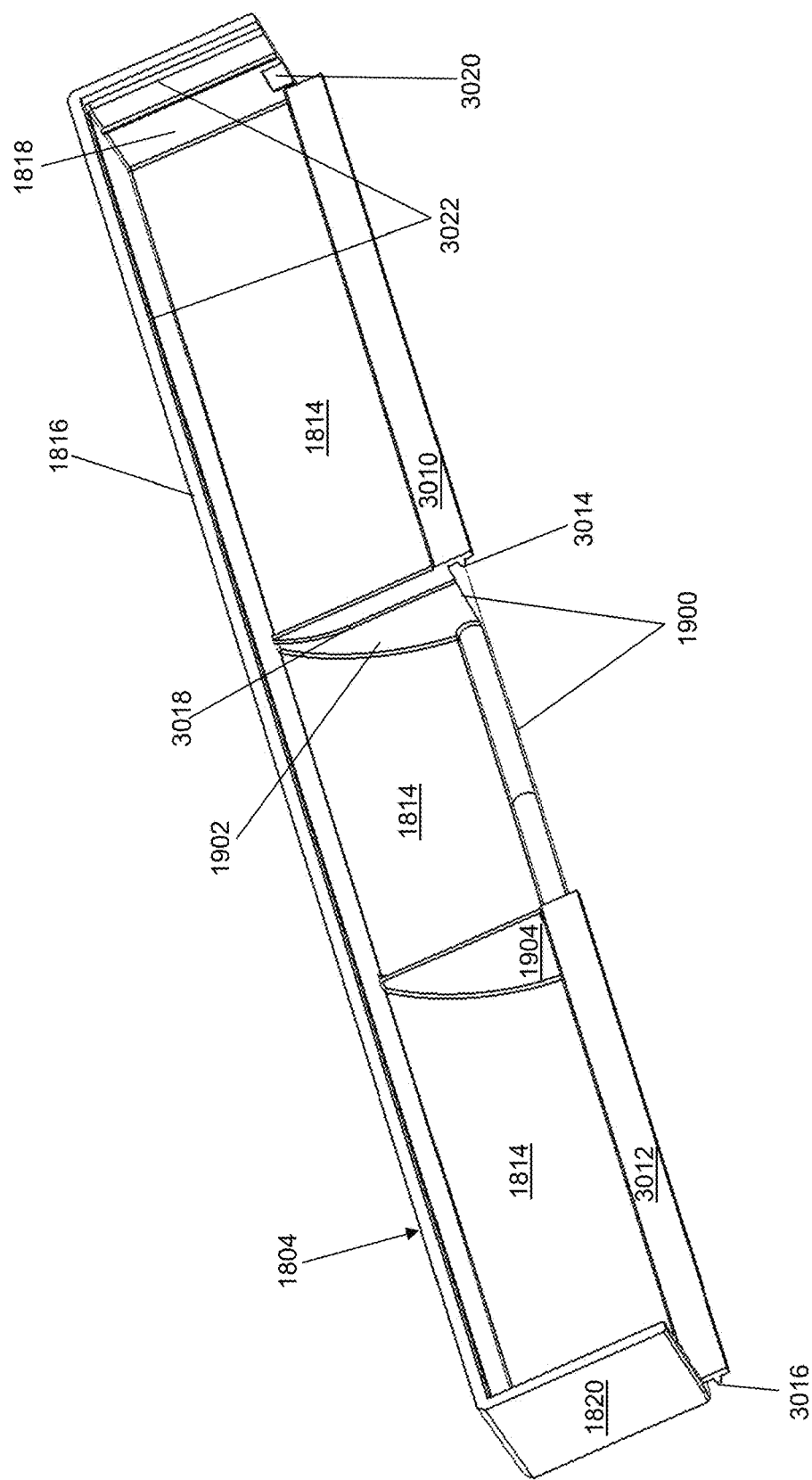
FIG. 30B depicts a back, right perspective view of a handle shell of the top drawer panel of FIG. 24 in accordance with an illustrative embodiment.
Figure 31:
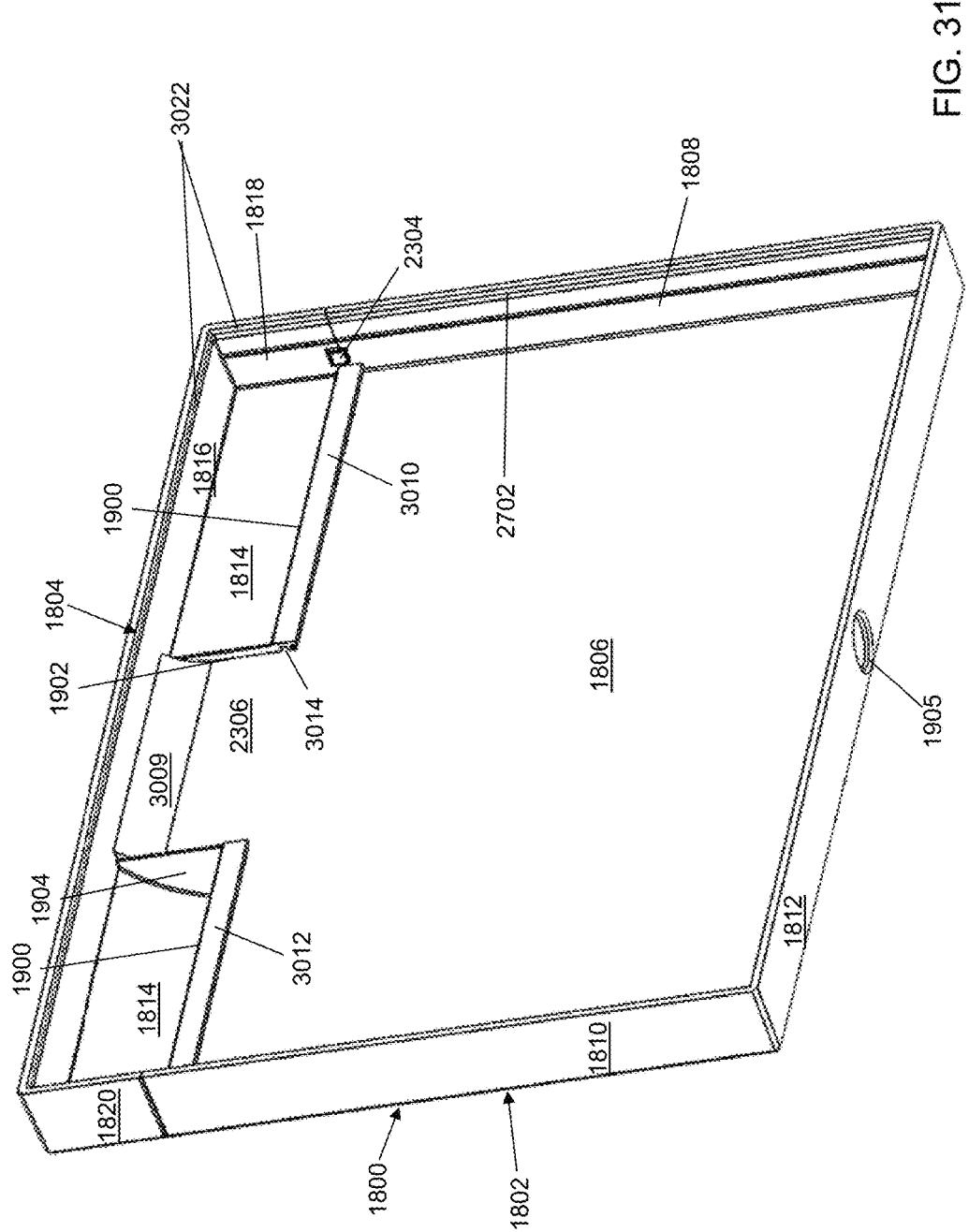
FIG. 31 depicts a back perspective view of a panel face shell 1800 of the top drawer panel of FIG. 24 in accordance with an illustrative embodiment.

With reference to FIG. 24, a top perspective view of top drawer panel 1520 of top drawer 206 is shown in accordance with an illustrative embodiment. With reference to FIG. 25, a bottom perspective view of top drawer panel 1520 of top drawer 206 is shown in accordance with an illustrative embodiment. With reference to FIG. 26, a back perspective view of top drawer panel 1520 of top drawer 206 is shown in accordance with an illustrative embodiment. With reference to FIG. 27, a right exploded, cross sectional view of top drawer panel 1520 of top drawer 206 is shown in accordance with an illustrative embodiment. With reference to FIG. 30A, a back perspective view of front shell 1802 is shown in accordance with an illustrative embodiment. With reference to FIG. 30B, a back perspective view of handle shell 1804 is shown in accordance with an illustrative embodiment. With reference to FIG. 31, a back perspective view of panel face shell 1800 is shown in accordance with an illustrative embodiment.

Referring to FIG. 30A, front shell 1802 may include a front wall 1806, a front wall extension 2306, a left side wall 1808, a right side wall 1810, a bottom wall 1812, a left tab 2304, a right tab 3000, a left front wall edge 3002, a right front wall edge 3004, a left front wall valley 3006, a right front wall valley 3008, and a first side wall valley 2702. Front shell 1802 may be formed of a single piece of material, for example, by molding. Left side wall 1808, right side wall 1810, and bottom wall 1812 extend in a generally perpendicular direction from front wall 1806. Front wall extension 2306 extends up from front wall 1806 and includes an arc shaped end portion 3009. Left tab 2304 extends up from left side wall 1808. Right tab 3000 extends up from right side wall 1810.

Left front wall edge 3002 defines an edge of front wall 1806 on a left side of front wall extension 2306. Right front wall edge 3004 defines an edge of front wall 1806 on a right side of front wall extension 2306. Left front wall valley 3006 is a valley formed in a back surface of front wall 1806 parallel to and below left front wall edge 3002. Right front wall valley 3008 is a valley formed in a back surface of front wall 1806 parallel to and below right front wall edge 3004. An applicator hole wall 1905 is formed through bottom wall 1812. First side wall valley 2702 is formed in back surfaces of left side wall 1808, right side wall 1810, and bottom wall 1812.

Referring to FIG. 30B, handle shell 1804 may include a handle front wall 1814, a top wall 1816, a handle left side wall 1818, a handle right side wall 1820, a handle bottom wall 1900, a left handle aperture wall 1902, a right handle aperture wall 1904, a left tab wall 3010, a right tab wall 3012, a left protrusion 3014, a right protrusion 3016, a left ledge 3018, and a right ledge (not shown), a left tab indentation 3020, a right tab indentation (not shown), and a second side wall valley 3022. Top wall 1816, handle left side wall 1818, handle right side wall 1820, and handle bottom wall 1900 extend in a generally perpendicular direction from handle front wall 1814. Handle front wall 1814 may have an arc shape such that handle bottom wall 1900 is wider at a center of handle front wall 1814 between handle left side wall 1818 and handle right side wall 1820.

Left tab wall 3010 extends in a generally perpendicular direction down from handle bottom wall 1900 between left handle aperture wall 1902 and handle left side wall 1818. Left protrusion 3014 extends in a generally perpendicular direction out from left tab wall 3010 towards handle front wall 1814. Left ledge 3018 is a ledge formed in left handle aperture wall 1902. Left tab indentation 3020 is an indentation formed in handle left side wall 1818.

Right tab wall 3012 extends in a generally perpendicular direction down from handle bottom wall 1900 between right handle aperture wall 1904 and handle right side wall 1820. Right protrusion 3016 extends in a generally perpendicular direction out from right tab wall 3012 towards handle front wall 1814. The right ledge is a ledge formed in right handle aperture wall 1904. The right tab indentation is an indentation formed in handle right side wall 1820. Second side wall valley 3022 is formed in back surfaces of handle left side wall 1818, handle right side wall 1820, and top wall 1816.

As best illustrated by FIG. 24, a handle used to open top drawer 206 is formed by left handle aperture wall 1902 and right handle aperture wall 1904 that extend outward from front wall extension 2306 to form the handle opening in handle support wall 1900. The handle is formed in a center portion of handle support wall 1900 by handle front wall 1814 that extends upward towards top wall 1816.

As best illustrated by FIG. 31, top wall 1816, front wall 1806, handle front wall 1814, front wall extension 2306, left side wall 1808, handle left side wall 1818, right side wall 1810, handle right side wall 1820, and bottom wall 1812 form a first cavity. Panel face shell 1800 is formed by mounting handle shell 1804 to front shell 1802. In the illustrative embodiment, handle shell 1804 is slid onto front shell 1802 such that left tab wall 3010 and right tab wall 3012 are in an interior of the cavity abutting a back surface of front wall 1806. Left protrusion 3014 mates with left front wall valley 3006, and right protrusion 3016 mates with right front wall valley 3008 to snap fit handle shell 1804 to front shell 1802. Left and right side edges of front wall extension 2306 abut left ledge 3018 formed in left handle aperture wall 1902 and the right ledge formed in right handle aperture wall 1904, respectively. Arc shaped end portion 3009 of front wall extension 2306 abuts top wall 1816. Left tab 2304 mates with left tab indentation 3020, and right tab 3000 mates with the right tab indentation to further snap fit handle shell 1804 to front shell 1802. First side wall valley 2702 and second side wall valley 3022 form an approximately continuous valley around a periphery of the first cavity except adjacent applicator hole wall 1905.

Figure 33:
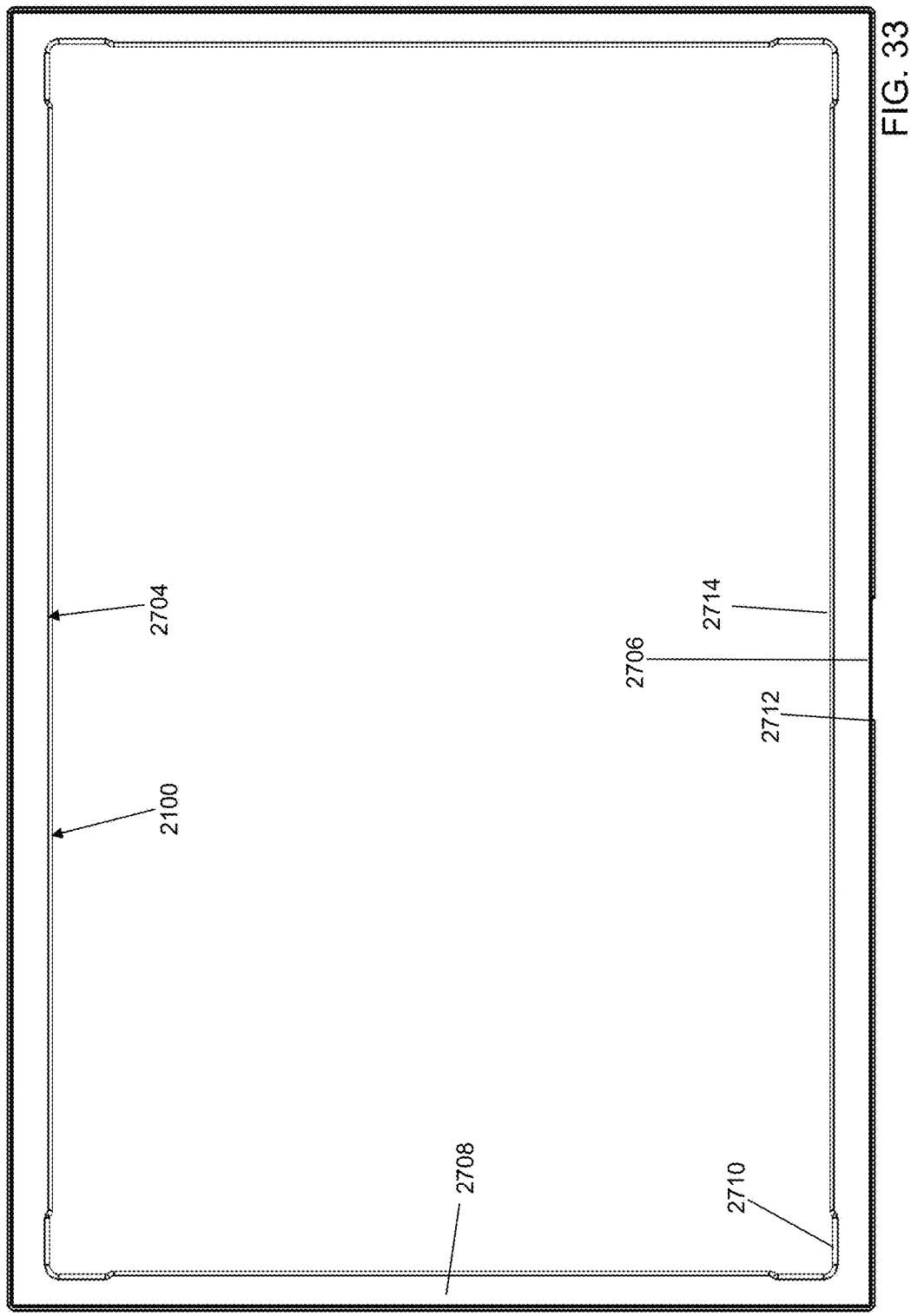
FIG. 33 depicts a front view of a ring wall of the top drawer panel of FIG. 24 in accordance with an illustrative embodiment.

With reference to FIG. 33, a front view of ring wall 2100 of top drawer 206 is shown in accordance with an illustrative embodiment. With reference to FIGS. 27 and 33, ring wall 2100 may form a ring channel 2704 defined by a channel outer wall 2706, a channel back wall 2708, and a channel inner wall 2710. Ring wall 2100 generally forms a rectangular shaped frame that is shaped and sized to fit within panel face shell 1800. A channel outer protrusion 2712 extends around a periphery of channel outer wall 2706 except in a center of a bottom of ring wall 2100 that is adjacent applicator hole wall 1905 when ring wall 2100 is mounted to panel face shell 1800. Ring wall 2100 is mounted to panel face shell 1800 by compressing ring wall 2100 sufficiently to fit channel outer wall 2706 within top wall 1816, left side wall 1808, handle left side wall 1818, right side wall 1810, handle right side wall 1820, and bottom wall 1812 of panel face shell 1800. After fitting ring wall 2100 within the side walls of panel face shell 1800, channel outer protrusion 2712 mates with first side wall valley 2702 and second side wall valley 3022 to snap fit ring wall 2100 to panel face shell 1800.

A channel inner ledge 2714 extends around a periphery of channel inner wall 2710 except in corners of ring wall 2100. Channel inner ledge 2714 may be rounded and extend in a generally perpendicular direction from channel inner wall 2710 towards an interior of an aperture defined by ring wall 2100.

Figure 32:
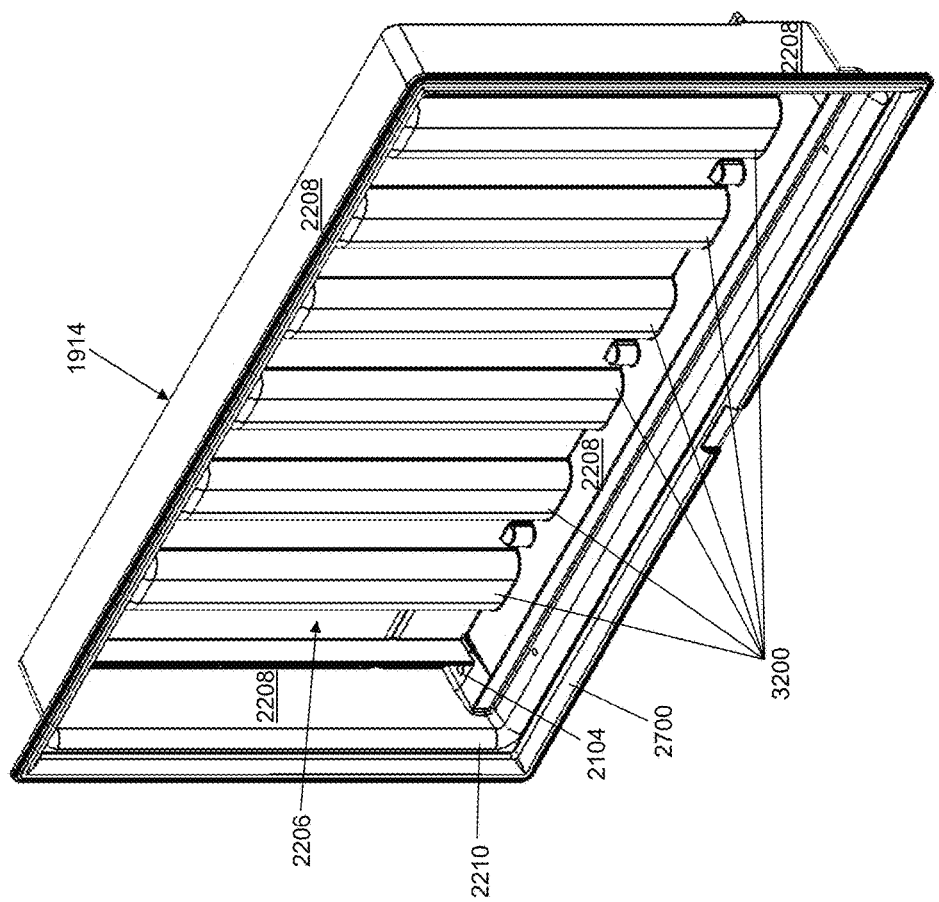
FIG. 32 depicts a front perspective view of a liner shell of the top drawer panel of FIG. 24 accordance with an illustrative embodiment.

With reference to FIG. 32, a front perspective view of liner shell 1914 of top drawer 206 is shown in accordance with an illustrative embodiment. Liner shell 1914 may be formed of a single piece of material, for example, by molding. With reference to FIGS. 21, 22, 27 and 32, liner shell 1914 may include a liner back wall 2206, liner side walls 2208, a liner lip 2210, a liner channel section 2700, a first left brace fastener aperture wall 2104, a first right brace fastener aperture wall 2106, container fastener aperture walls 2108, a second left brace fastener aperture wall 2212, a second right brace fastener aperture wall 2214, and liner support ribs 3200. Liner back wall 2206 generally has a rectangular shape though other shapes may be used. Liner support ribs 3200 are formed in liner back wall 2206 to make liner shell 1914 more rigid. In the illustrative embodiment, liner support ribs 3200 extend in an up and down direction though liner support ribs 3200 could extend in a left to right direction in an alternative embodiment. Liner support ribs 3200 further may not be needed.

Liner side walls 2208 extend in a generally perpendicular direction from a periphery of liner back wall 2206. Liner lip 2210 extends in a generally perpendicular direction from a periphery of liner side walls 2208. Liner channel section 2700 mounts to a periphery of liner lip 2210 and forms at least a portion of a c- or u-shaped channel. Liner back wall 2206 and liner side walls 2208 form a second cavity.

First left brace fastener aperture wall 2104 is formed through a bottom left portion of liner side walls 2208. First right brace fastener aperture wall 2106 is formed through a bottom right portion of liner side walls 2208. Container fastener aperture walls 2108 are formed through a bottom portion of liner side walls 2208 between first left brace fastener aperture wall 2104 and first right brace fastener aperture wall 2106. Second left brace fastener aperture wall 2212 is formed through an upper left portion of liner back wall 2206. Second right brace fastener aperture wall 2214 is formed through an upper right portion of liner back wall 2206.

Figure 34:
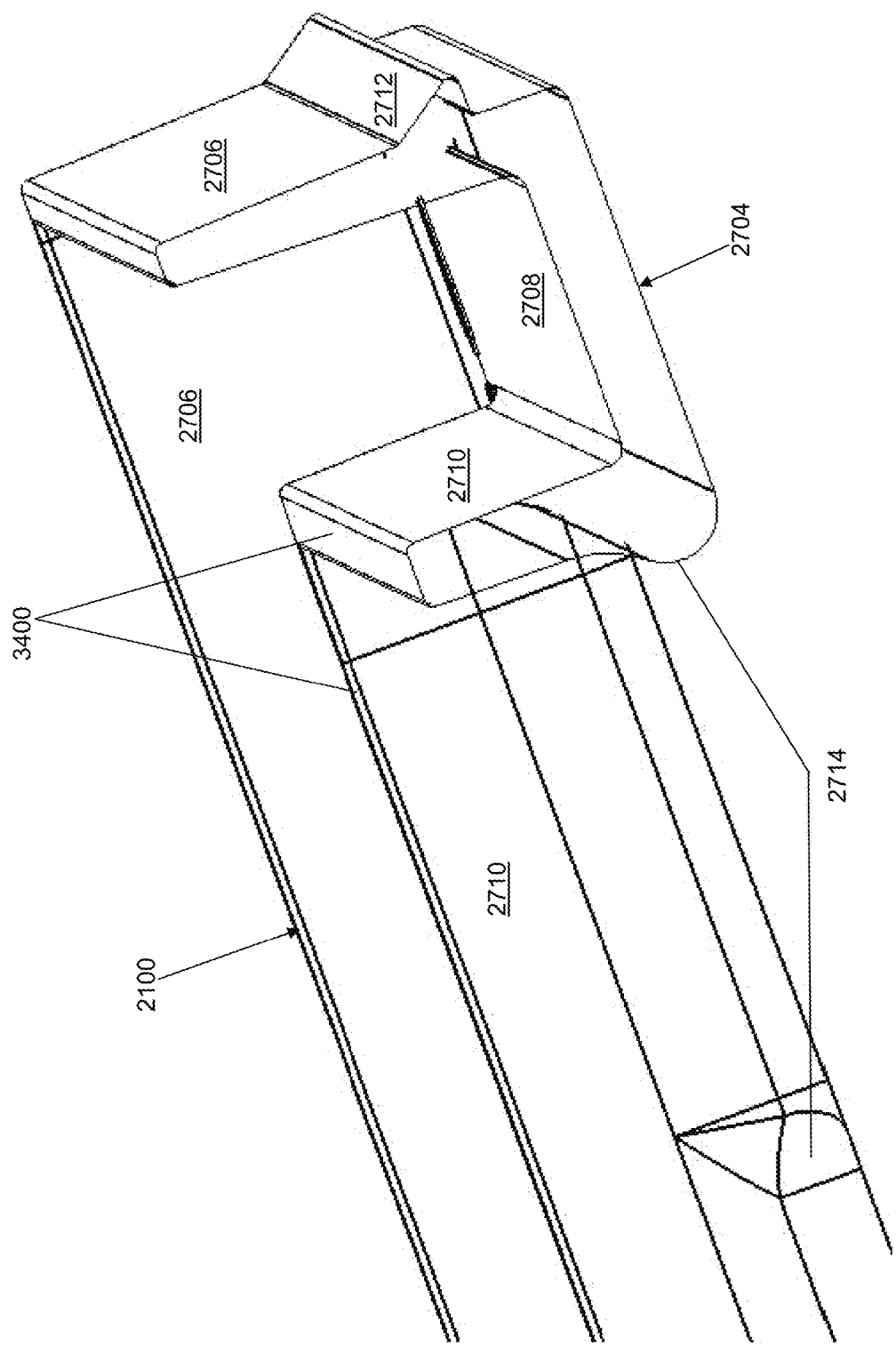
FIG. 34 depicts a right perspective cross sectional view of the ring wall of FIG. 33 is shown in accordance with an illustrative embodiment.

With reference to FIG. 34, a right perspective, cross sectional view of ring wall 2100 of top drawer 206 is shown in accordance with an illustrative embodiment. Ring wall 2100 includes a ring joint edge 3400 on a periphery of channel inner wall 2710 opposite channel inner ledge 2714.

Figure 35:
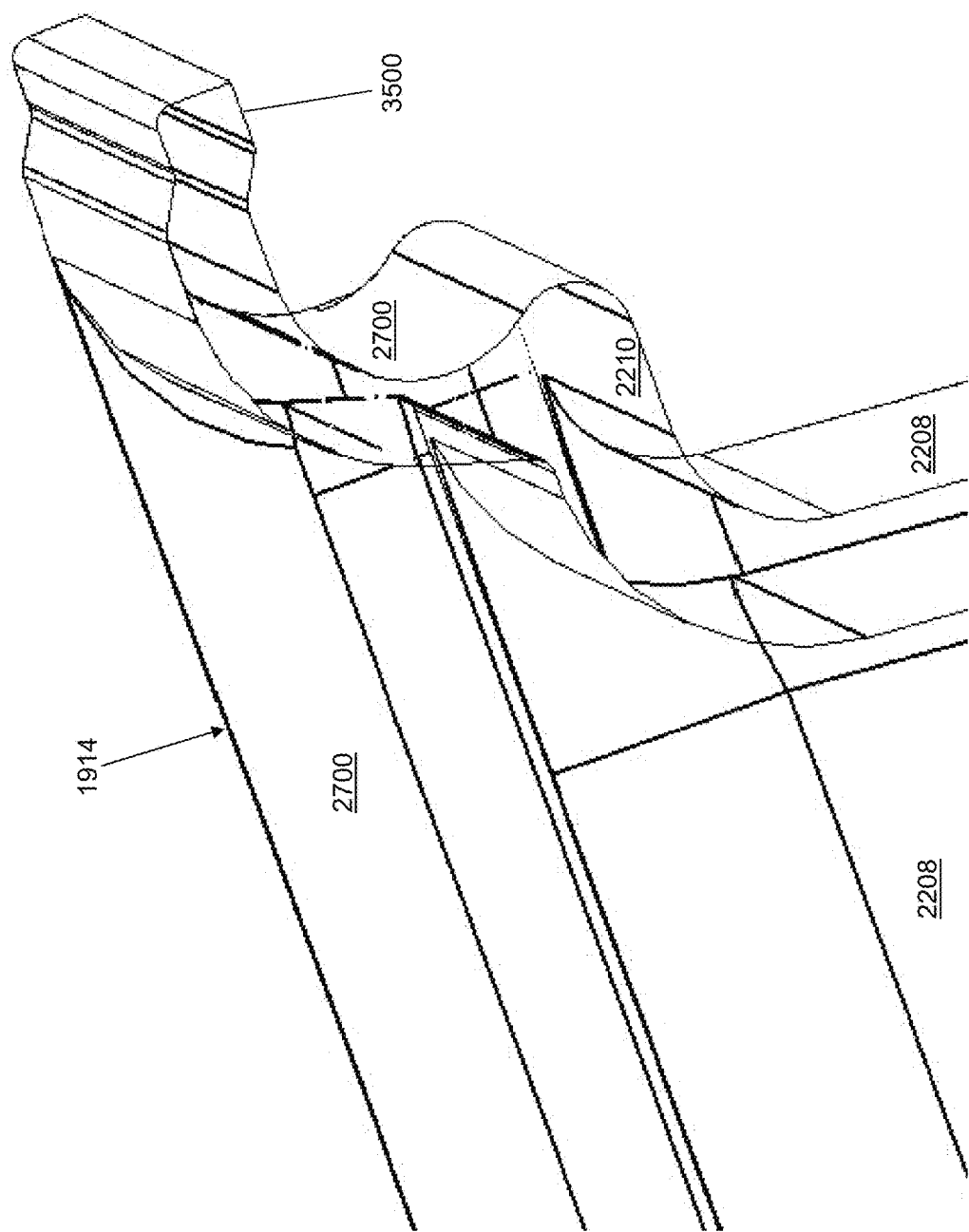
FIG. 35 depicts a right perspective cross sectional view of the liner shell of FIG. 32 in accordance with an illustrative embodiment.

With reference to FIG. 35, a right perspective, cross sectional view of liner shell 1914 of top drawer 206 is shown in accordance with an illustrative embodiment. Liner channel section 2700 includes a liner joint edge 3500 on a periphery of liner channel section 2700 opposite liner lip 2210.

Figure 36:
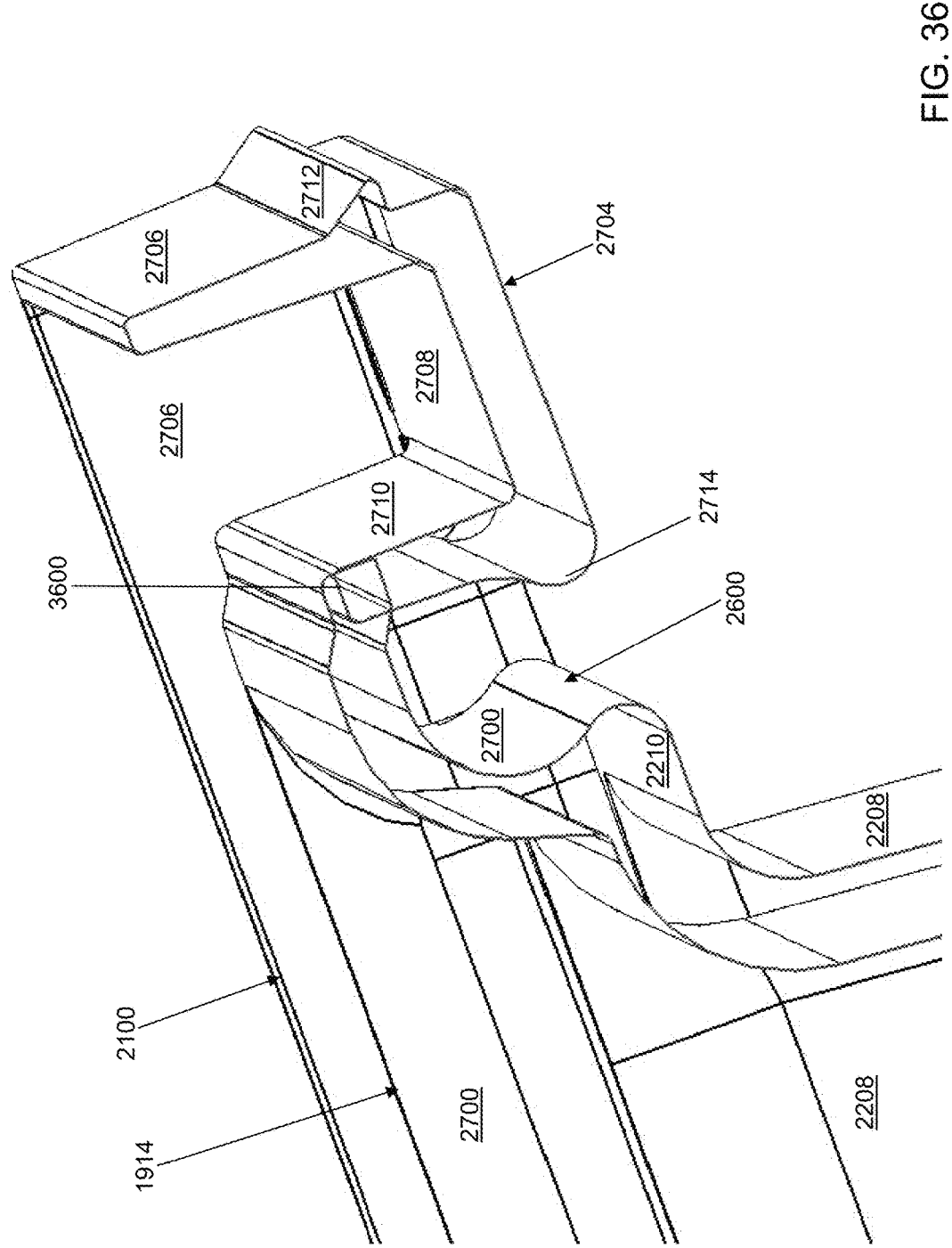
FIG. 36 depicts a right perspective cross sectional view of the liner shell of FIG. 35 joined to the ring wall of FIG. 34 in accordance with an illustrative embodiment.

With reference to FIG. 36, a right perspective, cross sectional view of liner shell 1914 joined to ring wall 2100 is shown in accordance with an illustrative embodiment. Liner shell 1914 may be mounted to ring wall 2100 by ultrasonic welding ring joint edge 3400 to liner joint edge 3500 to form a joint 3600 though other mounting methods may be used such as adhesive. As understood by a person of skill in the art, ultrasonic welding is a fastening method whereby high-frequency ultrasonic acoustic vibrations are locally applied to pieces held together under pressure to create a solid-state weld. Liner lip 2210, channel section 2700, channel inner wall 2710, and channel inner ledge 2714 together form a freezer drawer gasket channel 2600.

Freezer drawer gasket channel 2600 may have a circular or elliptical cross section that forms at least 65% of an ellipse. Of course, a circle is an example of an ellipse as understood by a person of skill in the art. In the illustrative embodiment, channel section 2700 forms approximately 75% of freezer drawer gasket channel 2600 while channel inner wall 2710 forms a remaining 25% of freezer drawer gasket channel 2600. In alternative embodiments, channel section 2700 may form from 25% to 75% of freezer drawer gasket channel 2600 while channel inner wall 2710 forms a remainder of freezer drawer gasket channel 2600 from 75% to 25%.

With reference to FIG. 28, a side view of top drawer gasket 1530 is shown in accordance with an illustrative embodiment. Top drawer gasket 1530 may include a drawer gasket prong 2800 and a drawer gasket body 2802. Drawer gasket prong 2800 is inserted into freezer drawer gasket channel 2600 formed when liner shell 1914 is mounted to ring wall 2100. Freezer drawer gasket channel 2600 is sized and shaped to hold drawer gasket prong 2800 of top drawer gasket 1530. Insertion of drawer gasket prong 2800 into freezer drawer gasket channel 2600 mounts top drawer gasket 1530 to top drawer 206.

When top drawer 206 is positioned in the closed position relative to refrigerator body 118, drawer gasket body 2802 compresses against freezer drawer liner wall 1222 to seal top drawer 206 providing an air tight seal and thereby preventing moisture and relatively warm air from migrating into freezer compartment 200 and keeping cool air within freezer compartment 200. As understood by a person of skill in the art, top drawer gasket 1530 may be made from a material that is deformable to tightly fill the space between freezer drawer liner wall 1222 and top drawer panel 1520. For example, top drawer gasket 1530 may be formed of plastic, rubber or other elastomeric material to provide the compression sealing between drawer gasket body 2802 and freezer drawer liner wall 1222 with ribbing to allow the deformation.

Referring to FIG. 21, when panel face shell 1800, liner shell 1914, and ring wall 2100 are mounted to each other the first cavity and the second cavity are joined to form an enclosure within top drawer panel 1520. Applicator hole wall 1905 provides access to the first cavity and the second cavity when liner shell 1914 and ring wall 2100 are mounted to panel face shell 1800. An insulating material may be introduced into the first cavity and the second cavity through a hole formed by applicator hole wall 1905. After introduction of the insulating material, a cover tab 2116 may be mounted to panel face shell 1800 to cover the hole formed by applicator hole wall 1905.

With reference to FIG. 29, a left brace 2202 is shown in accordance with an illustrative embodiment. Left brace 2202 has an elongated "L" shape. Left brace 2202 may include a first left brace aperture wall 2900 and a second left brace aperture wall 2204. First left brace aperture wall 2900 is formed through a bottom of the elongated "L" shape. Second left brace aperture wall 2204 is formed through a top of the elongated "L" shape. Left brace 2202 is mounted to liner shell 1914 such that first left brace aperture wall 2900 aligns with first left brace fastener aperture wall 2104, and second left brace aperture wall 2204 aligns with second left brace fastener aperture wall 2212. A left brace fastener 1910 is inserted into first left brace aperture wall 2900 and first left brace fastener aperture wall 2104.

Referring to FIGS. 21 and 22, a right brace 2102 may be identical to left brace 2202. Right brace 2102 may include a first right brace aperture wall 2103 and a second right brace aperture wall 2200. First right brace aperture wall 2103 is formed through a bottom of the elongated "L" shape. Second right brace aperture wall 2200 is formed through a top of the elongated "L" shape. Left brace 2202 is mounted to liner shell 1914 such that first right brace aperture wall 2103 aligns with first right brace fastener aperture wall 2106, and second right brace aperture wall 2200 aligns with second right brace fastener aperture wall 2214. A right brace fastener 1912 is inserted into first right brace aperture wall 2103 and first right brace fastener aperture wall 2106.

A left container wall fastener 2110 is inserted into second left brace aperture wall 2204, into second left brace fastener aperture wall 2212, and into a left end of a top wire of top drawer container walls 1518. A right container wall fastener 2112 is inserted into second right brace aperture wall 2200, into second right brace fastener aperture wall 2214, and into a right end of the top wire of top drawer container walls 1518.

Referring to FIG. 18, top drawer container walls 1518, top drawer base 1516, and liner back wall 2206 form a container in which frozen food items may be stored. Referring to FIGS. 19 and 21, a container mounting flange 1906 extends from base 1516 towards liner back wall 2206. Container fastener aperture walls 2114 are formed through container mounting flange 1906. Container fasteners 1908 are inserted into container fastener aperture walls 2108 aligned with container fastener aperture walls 2114 to mount top drawer base 1516 to top drawer panel 1520.

Referring to FIG. 20, a left slide aperture wall 2000 is formed in a left side of top drawer base 1516, and a right slide aperture wall 2002 is formed in a right side of top drawer base 1516. Left slide aperture wall 2000 and right slide aperture wall 2002 are sized and shaped to allow insertion of left, top drawer mounting mechanism 1620 and right, top drawer mounting mechanism 1400, respectively.

Figure 37:
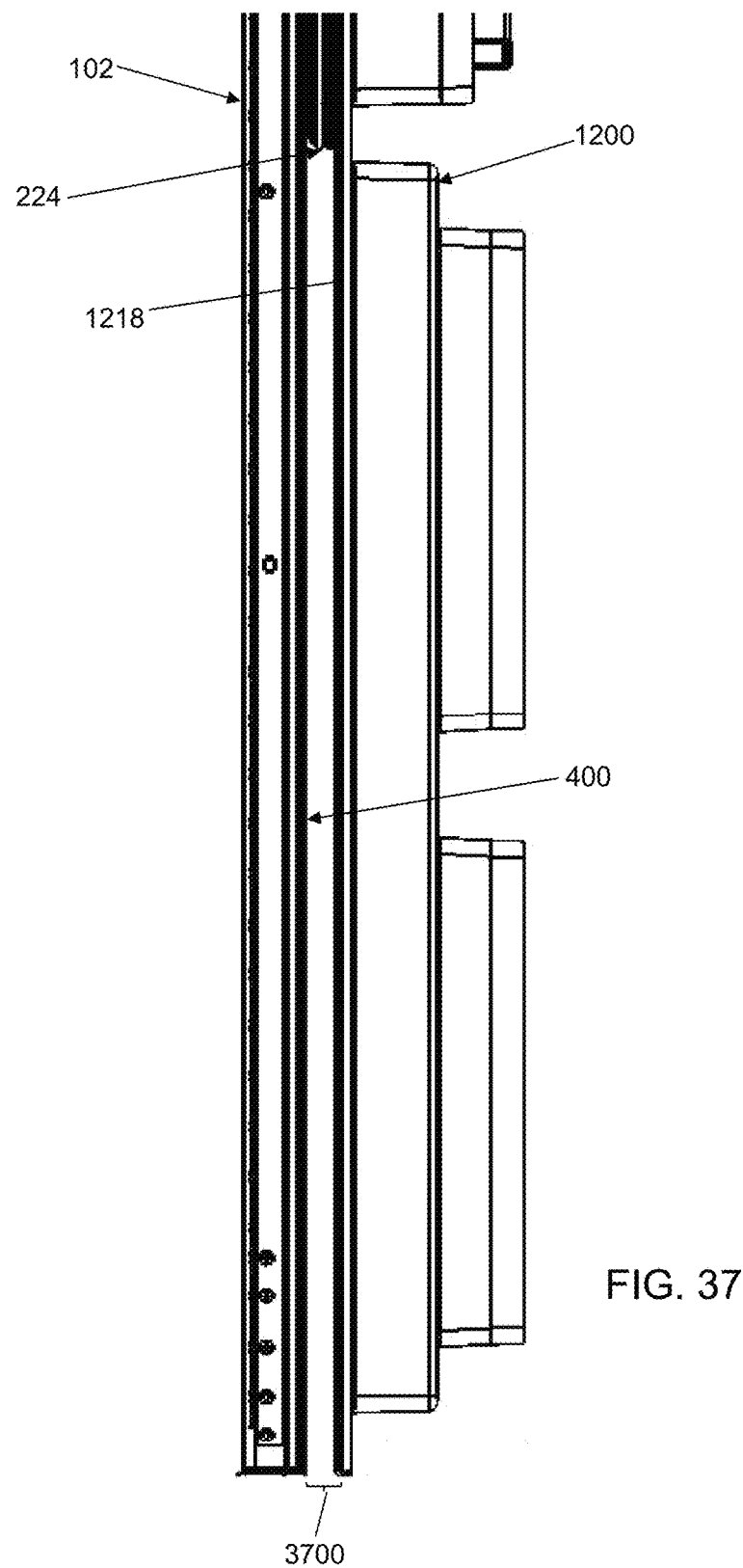
FIG. 37 depicts a side view of a lower portion of the door FIG. 4 and the frame of FIG. 12 in a closed position in accordance with an illustrative embodiment.

With reference to FIG. 37, a side view of a lower portion of door 102 and frame 1200 with door 102 in a closed position is shown. A gap 3700 is formed between right bottom frame wall 1218 and freezer section wall 400 so that air can flow upwards from the cooling components mounted within pedestal frame 300 to an exterior of top drawer 206 and bottom drawer 208. The circulating air keeps condensation from forming on bottom frame 1204 including bottom frame wall 1214, left bottom frame wall 1216, right bottom frame wall 1218, freezer compartment aperture wall 1220, and freezer drawer liner wall 1222. The curved surfaces of depression 212 directs the circulating air towards freezer compartment 200. Depression 212 may be aligned above, below, or in line with bottom wall 114 of refrigerator body 118 to assist in directing the air.

In the illustrative embodiment, front shell 1802 is snap fit together with handle shell 1804. Liner shell 1914 and ring wall 2100 are welded together. Ring wall 2100 is snap fit together with front shell 1802 and handle shell 1804 by mating channel outer protrusion 2712 with first side wall valley 2702 and with second side wall valley 3022, respectively. Top drawer gasket 1530 is fitted into freezer drawer gasket channel 2600. Top drawer base 1516 and top drawer container walls 1518 are mounted directly to liner shell 1914 of top drawer panel 1520 to provide a simplified construction for a freezer drawer.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A method of making a gasket track for a gasket comprising:
    forming a first section of a c-shaped channel comprising from 50% to 75% of the c-shaped channel of a first plastic material;
    forming a second section of a c-shaped channel comprising from 25% to 50% of the c-shaped channel of a second plastic material; and
    joining the formed first section together with the formed second section to form all of the c-shaped channel,
    wherein the c-shaped channel has a circular cross section that forms at least 65% of an ellipse.

2. The method of claim 1, wherein the first plastic material and the second plastic material comprise a thermoplastic polymer.

3. The method of claim 1, wherein the first plastic material is a same material as the second plastic material.

4. The method of claim 1, wherein the formed first section and the formed second section are joined using an ultrasonic welding process.

5. A method of making a drawer panel for a freezer drawer comprising:
    forming a first section of a c-shaped channel comprising from 50% to 75% of the c-shaped channel of a first plastic material;
    forming a second section of a c-shaped channel comprising from 25% to 50% of the c-shaped channel of a second plastic material;
    joining the formed first section together with the formed second section to form all of the c-shaped channel, wherein the c-shaped channel has a circular cross section that forms at least 65% of an ellipse, wherein the joining attaches a liner shell to a ring wall;
    attaching a panel face shell to the ring wall; and
    inserting a gasket into the c-shaped channel.

6. The method of claim 5, wherein the first plastic material and the second plastic material comprise a thermoplastic polymer.

7. The method of claim 5, wherein the formed first section and the formed second section are joined using an ultrasonic welding process.

8. The method of claim 5, wherein the panel face shell is attached to the ring wall using a snap fit.

9. The method of claim 5, wherein the panel face shell is attached to the ring wall by compressing the ring wall to slide between a plurality of side walls of the panel face shell until a ledge that extends outward from the ring wall is inserted into a channel formed in an inner face of the plurality of side walls.

10. The method of claim 5, further comprising, before attaching the panel face shell to the ring wall, attaching a handle piece to a front wall of the panel face shell.

11. The method of claim 10, wherein the handle piece is attached to the front wall of the panel face shell by sliding the handle piece onto the front wall and mating a tab extending from the front wall with an indentation formed in the handle piece.

12. The method of claim 5, further comprising injecting an insulating material into a cavity formed by a front wall of the panel face shell, a back wall of the liner shell, and a plurality of side walls of the liner shell.

13. The method of claim 12, wherein the insulating material is injected through a hole formed in a side wall of the panel face shell.

14. The method of claim 13, further comprising, after injecting the insulating material, sliding a cover plate between the side wall of the panel face shell and the ring wall to cover the hole.

15. A method of making a freezer drawer comprising:
forming a first section of a c-shaped channel comprising from 50% to 75% of the c-shaped channel of a first plastic material;
forming a second section of a c-shaped channel comprising from 25% to 50% of the c-shaped channel of a second plastic material;
joining the formed first section together with the formed second section to form all of the c-shaped channel, wherein the c-shaped channel has a circular cross section that forms at least 65% of an ellipse, wherein the joining attaches a liner shell to a ring wall;
attaching a container to the liner shell;
attaching a panel face shell to the ring wall; and
inserting a gasket into the c-shaped channel.

16. The method of claim 15, wherein a left side wall, a right side wall, and a back wall of the container are formed of a wire mesh.

17. The method of claim 15, wherein the container is attached to the liner shell before the panel face shell is attached to the ring wall.

18. The method of claim 15, wherein the container is attached to the liner shell after the liner shell is joined to the ring wall.

19. The method of claim 15, wherein attaching the container to the liner shell comprises:
attaching a left side wall of the container to a back wall of the liner shell;
attaching a right side wall of the container to the back wall of the liner shell; and
attaching a bottom wall of the container to a side wall of the liner shell.

20. The method of claim 19, wherein attaching the left side wall of the container to the back wall of the liner shell, attaching the right side wall of the container to the back wall of the liner shell, and attaching the bottom wall of the container to the side wall of the liner shell each use a fastener.

* * * * *